Figures 3, 4, 5:
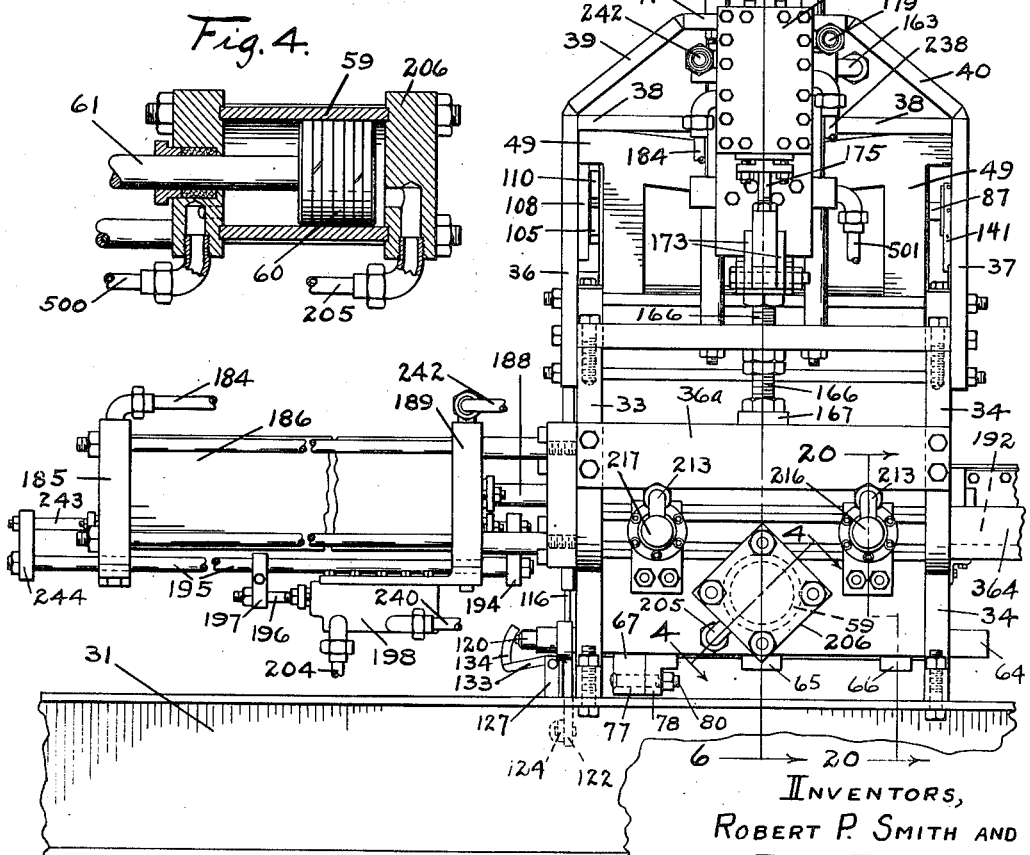

July 10, 1951
R. P. SMITH ET AL
2,560,491
CORK ROD FORMING MACHINE AND METHOD
Filed April 22, 1948
14 Sheets-Sheet 1
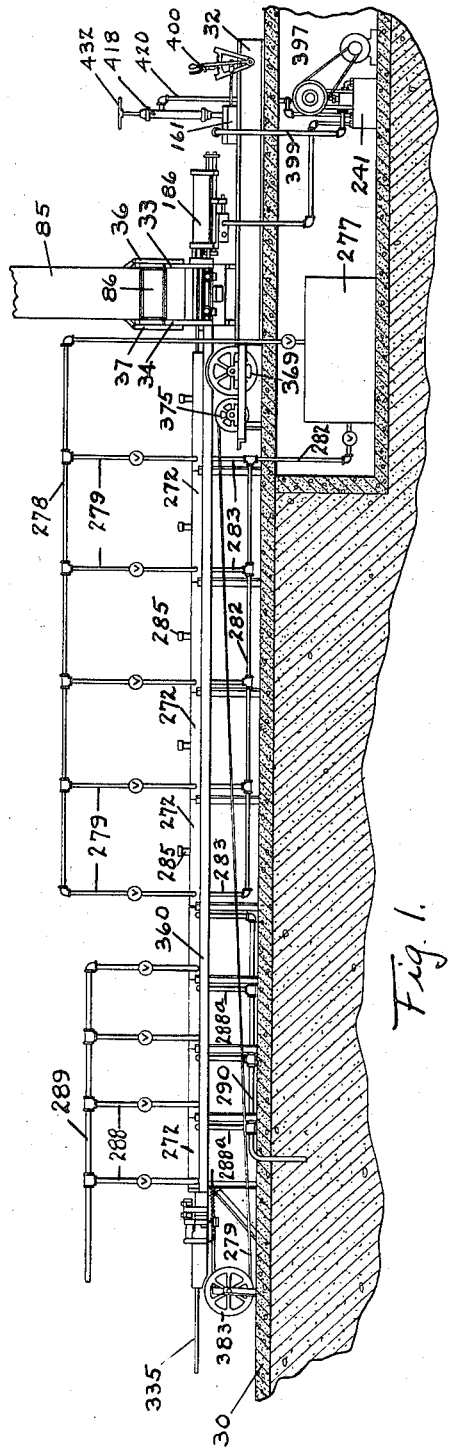
INVENTORS,
ROBERT P. SMITH AND
FRED E. JAMES,
By Herbert A. Minturn,
ATTORNEY.

July 10, 1951 R. P. SMITH ET AL 2,560,491
CORK ROD FORMING MACHINE AND METHOD
Filed April 22, 1948 14 Sheets-Sheet 2

INVENTORS,
ROBERT P. SMITH AND
FRED E. JAMES,
By Herbert A. Minturn,
ATTORNEY.

July 10, 1951 R. P. SMITH ET AL 2,560,491
CORK ROD FORMING MACHINE AND METHOD
Filed April 22, 1948 14 Sheets-Sheet 3

INVENTORS,
ROBERT P. SMITH AND
FRED E. JAMES,
By Herbert A. Minturn,
ATTORNEY.

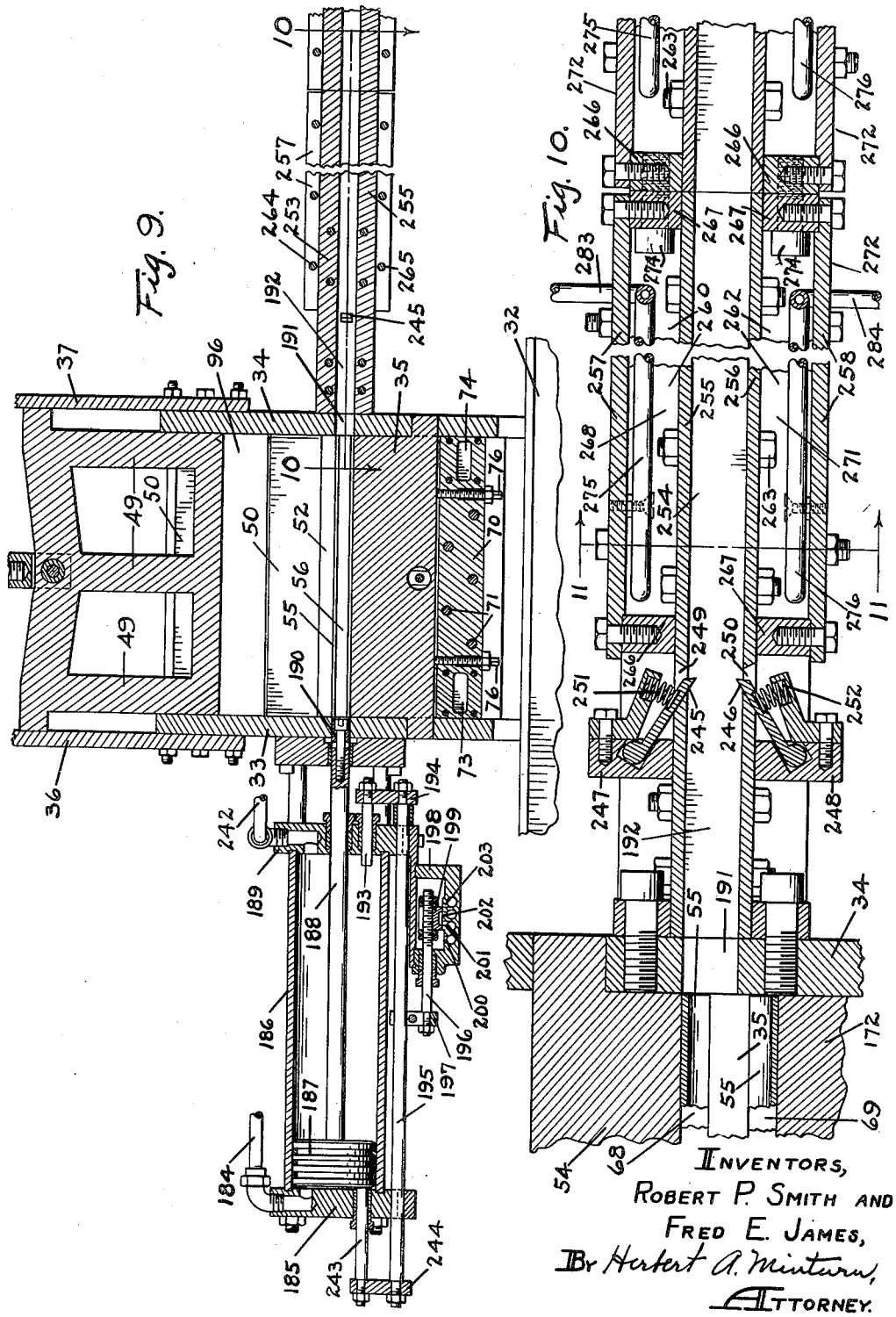

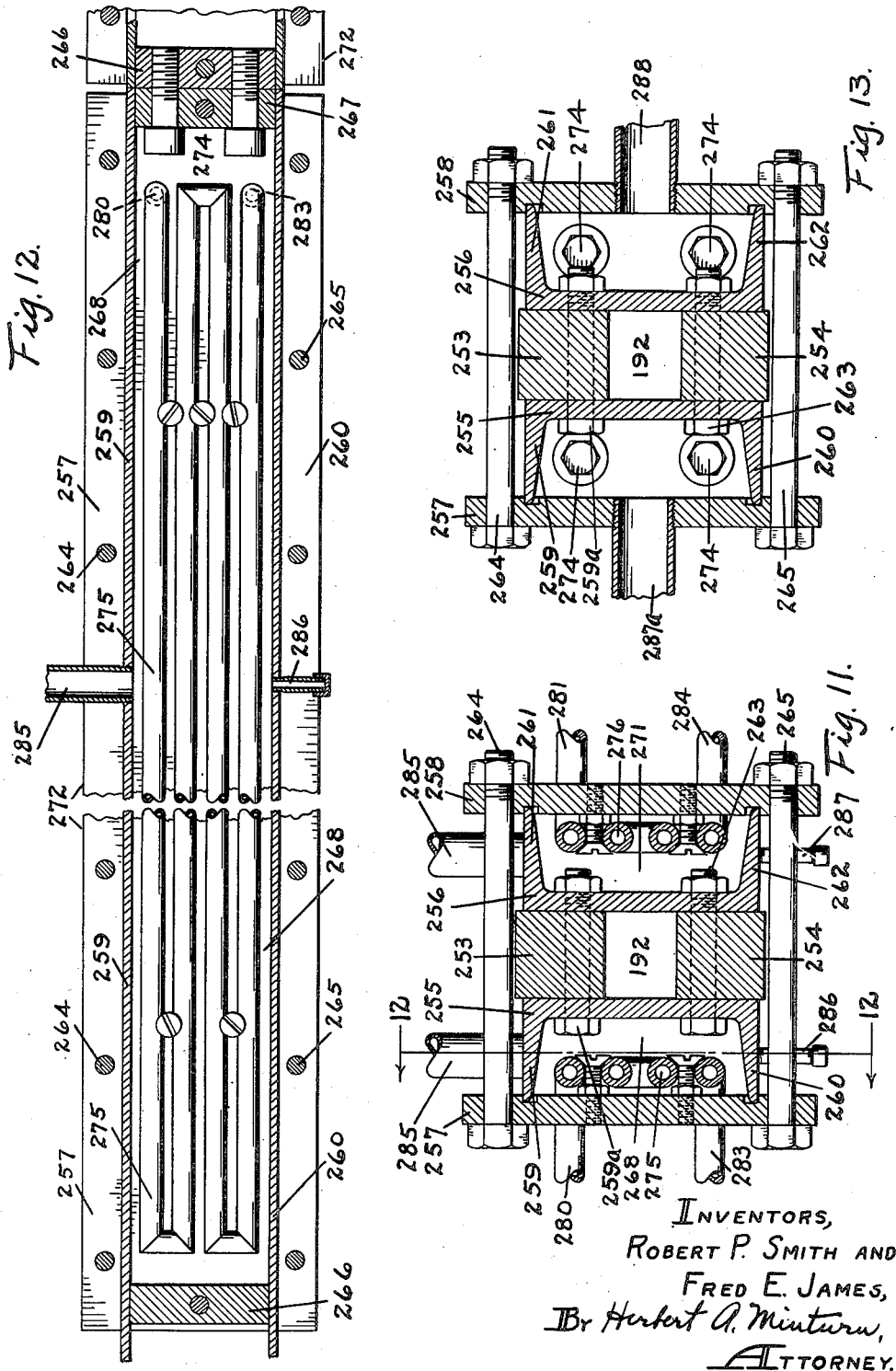

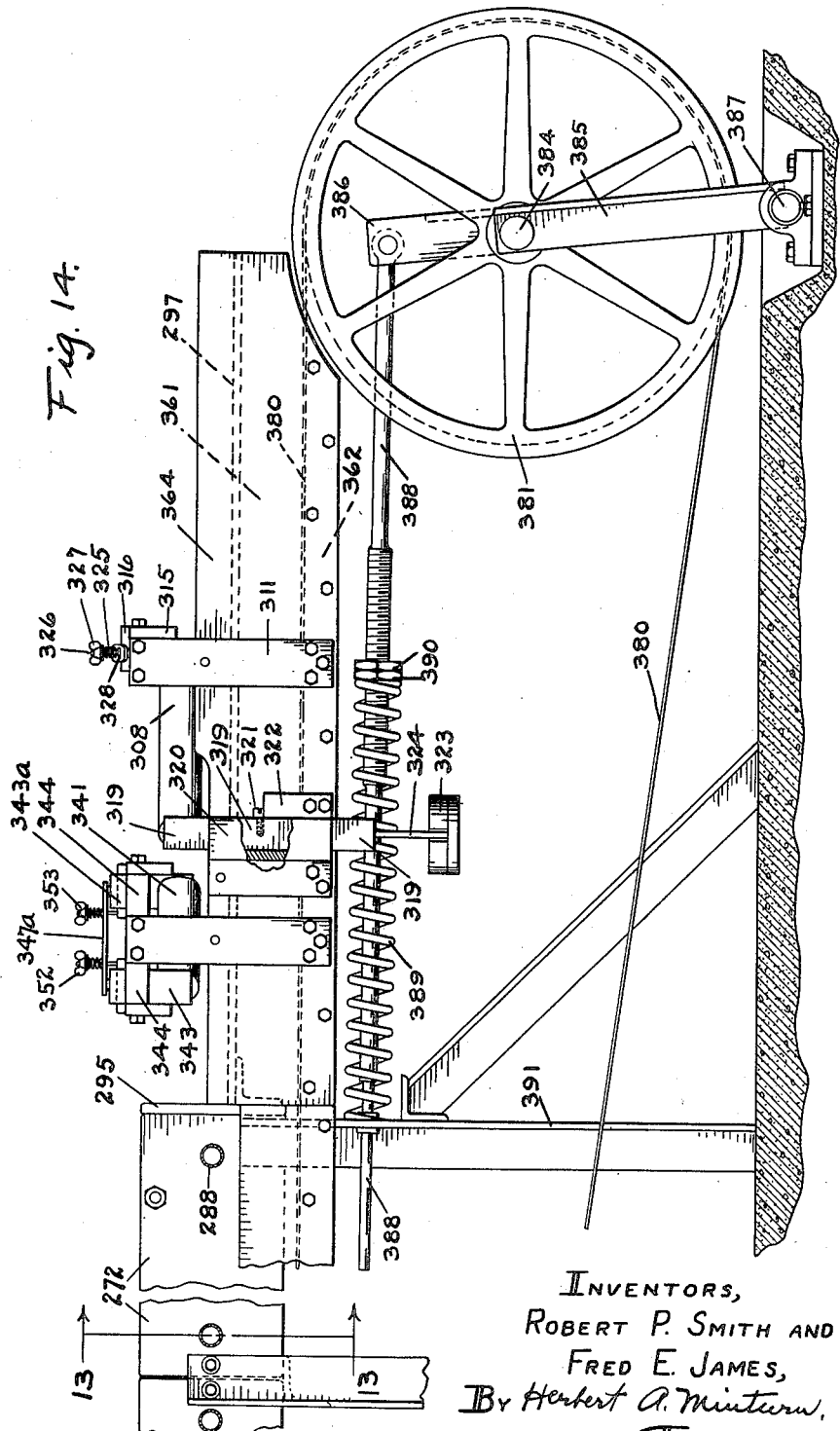

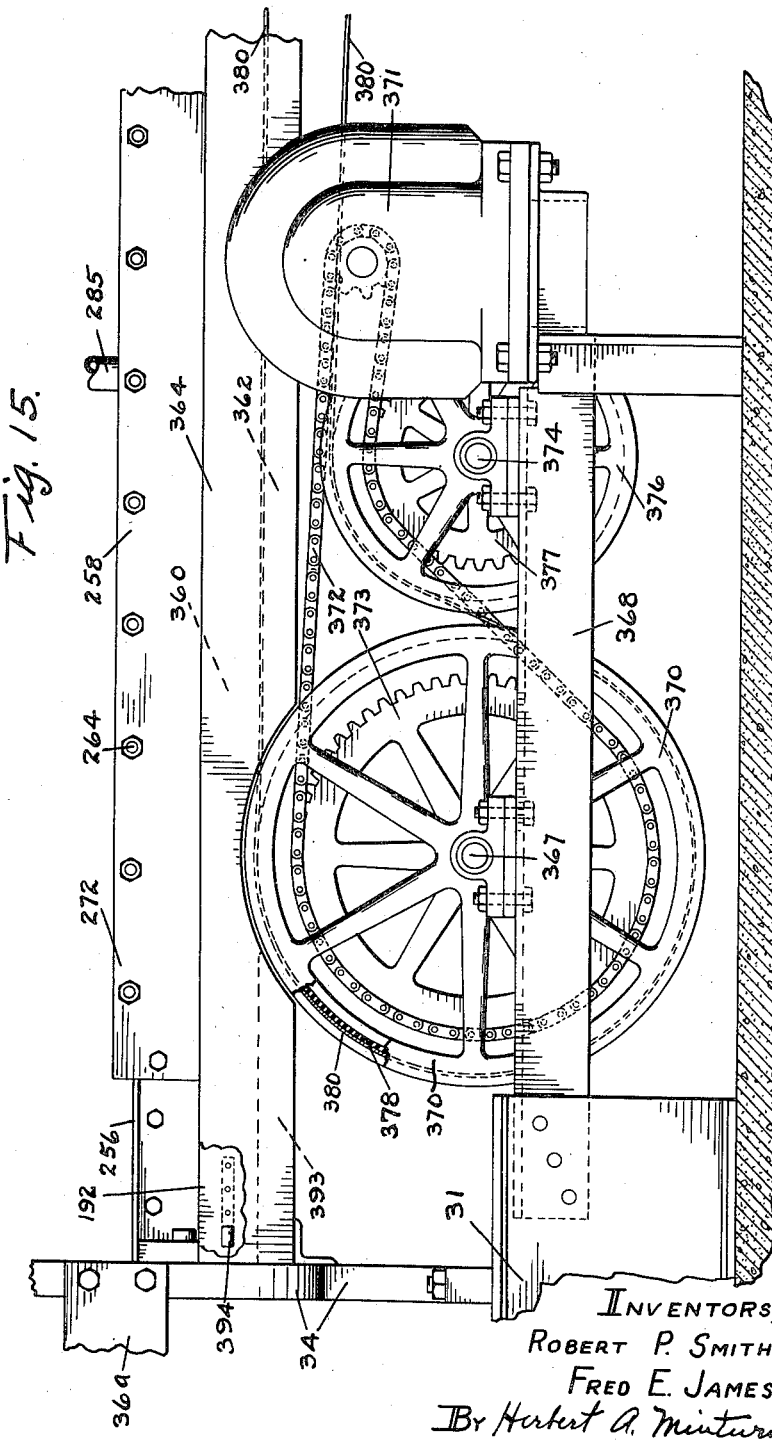

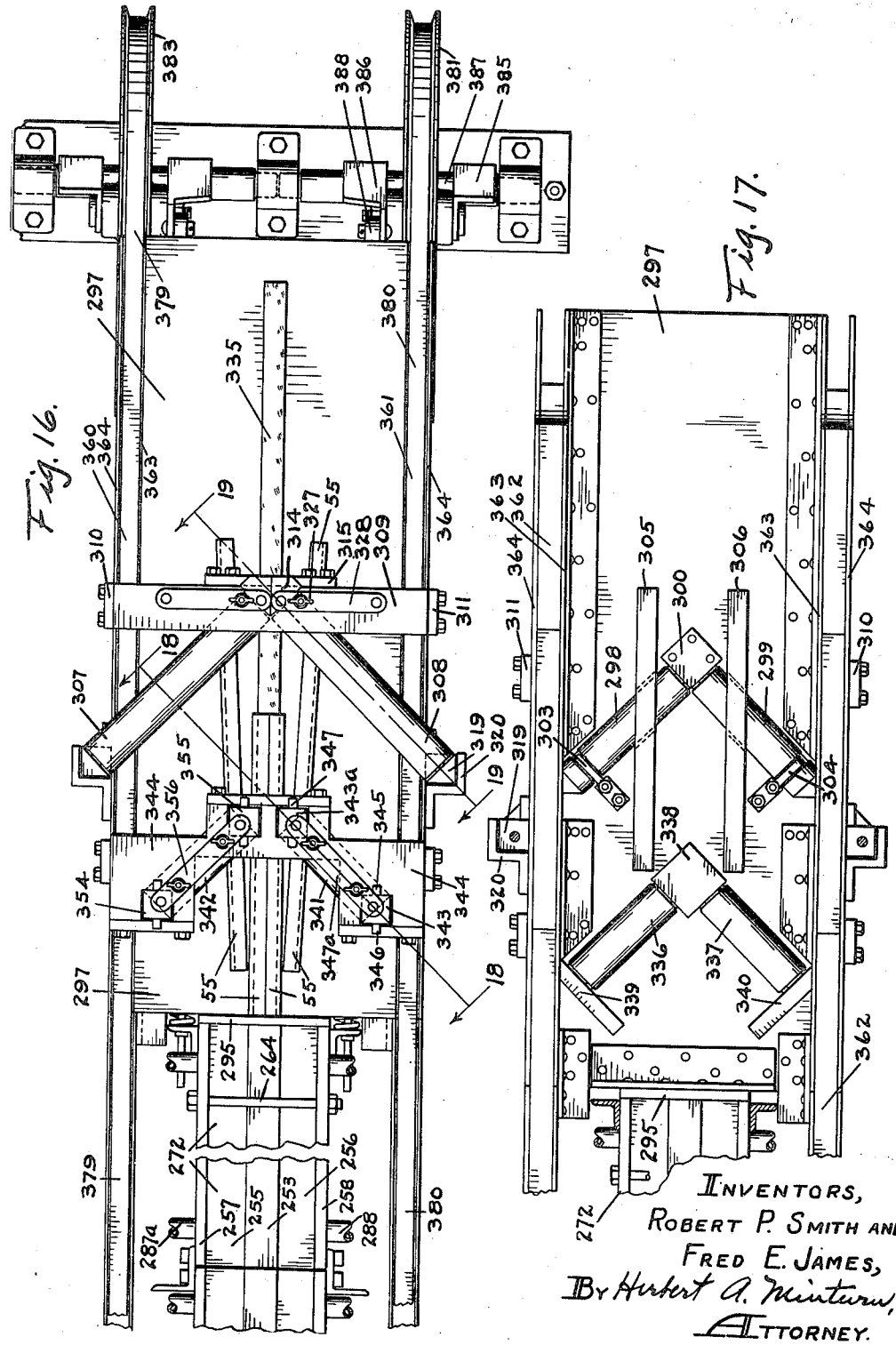

July 10, 1951

R. P. SMITH ET AL 2,560,491

CORK ROD FORMING MACHINE AND METHOD

Filed April 22, 1948

14 Sheets-Sheet 9

INVENTORS,
ROBERT P. SMITH AND
FRED E. JAMES,
By Herbert A. Minturn
ATTORNEY.

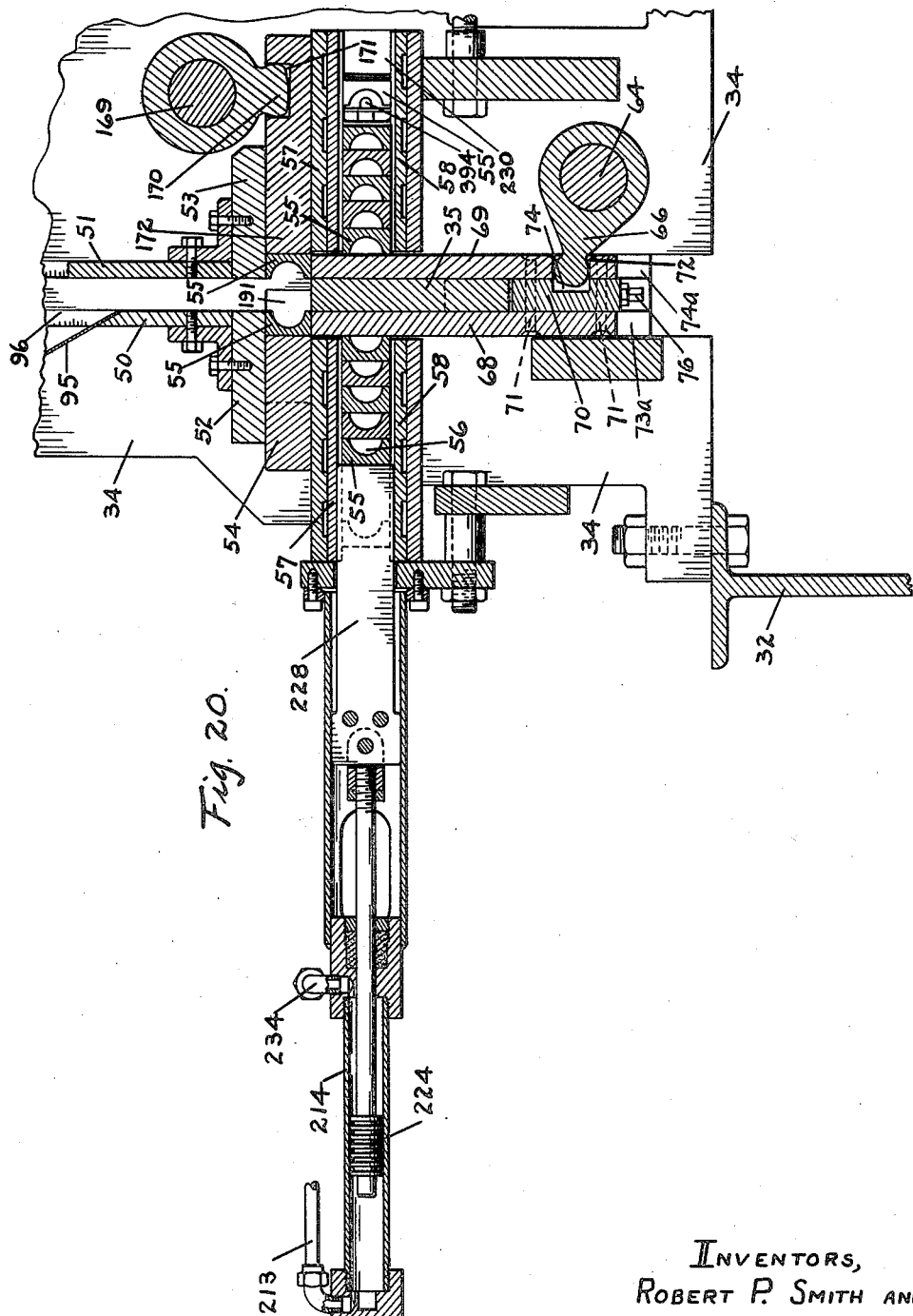

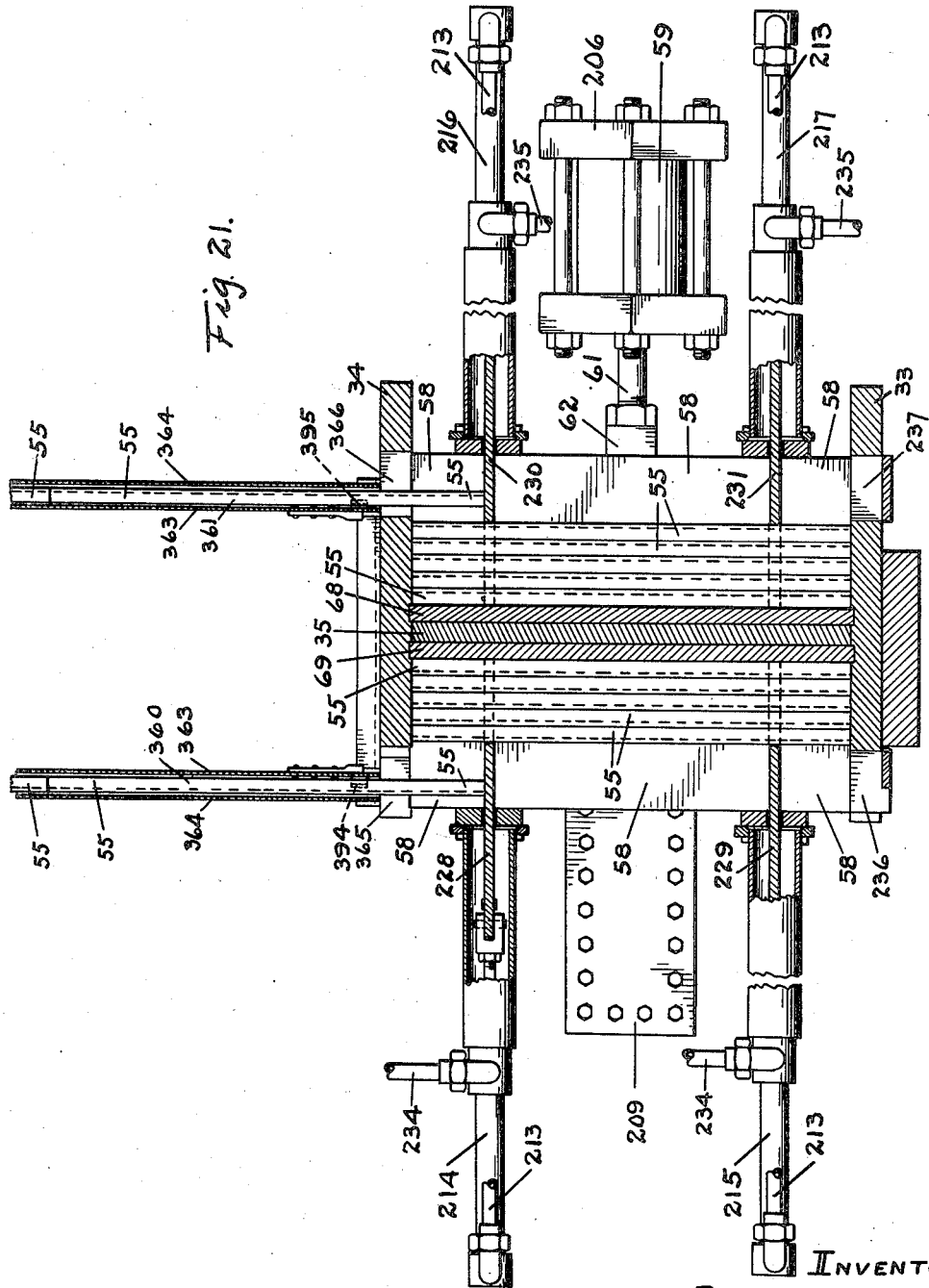

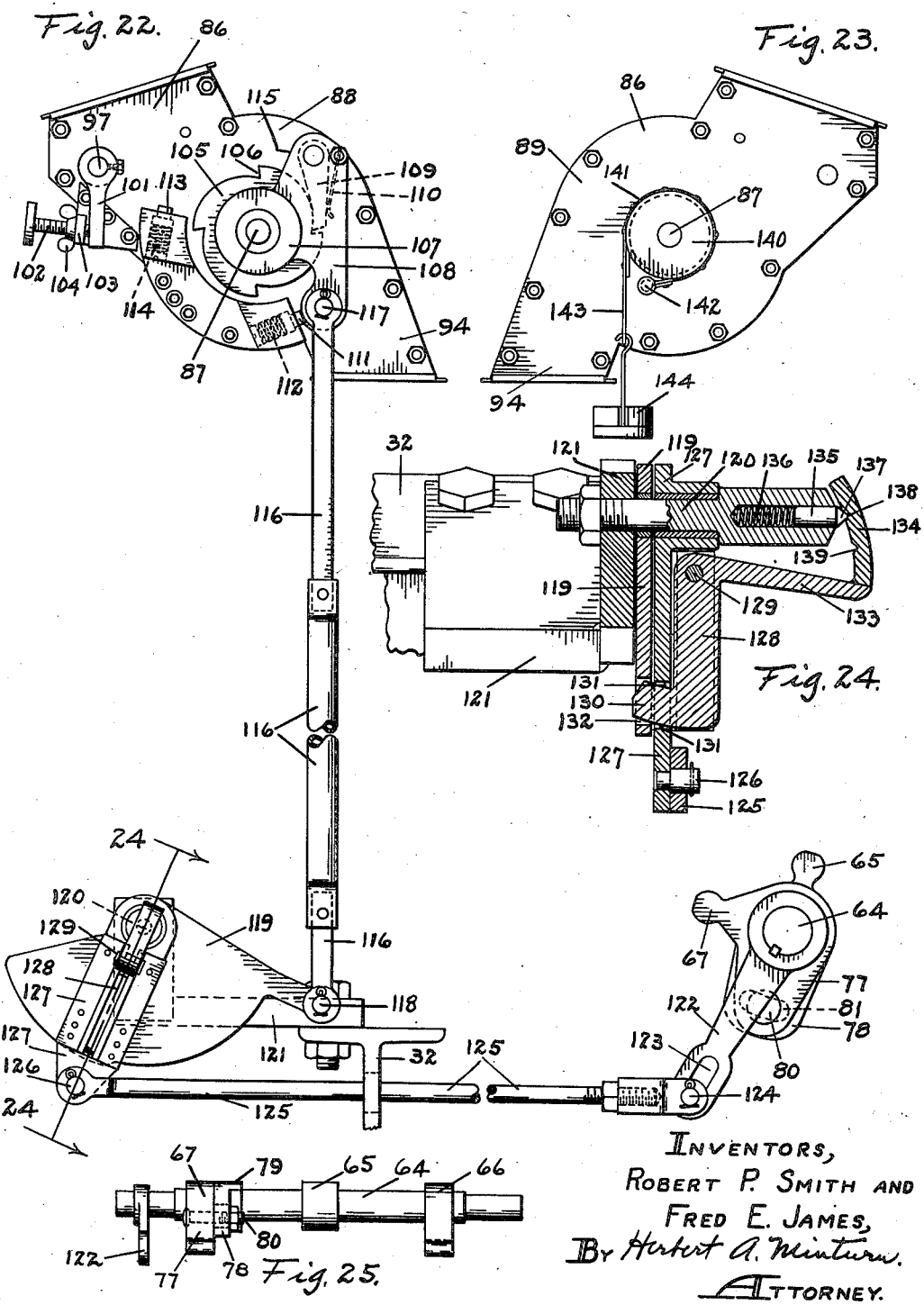

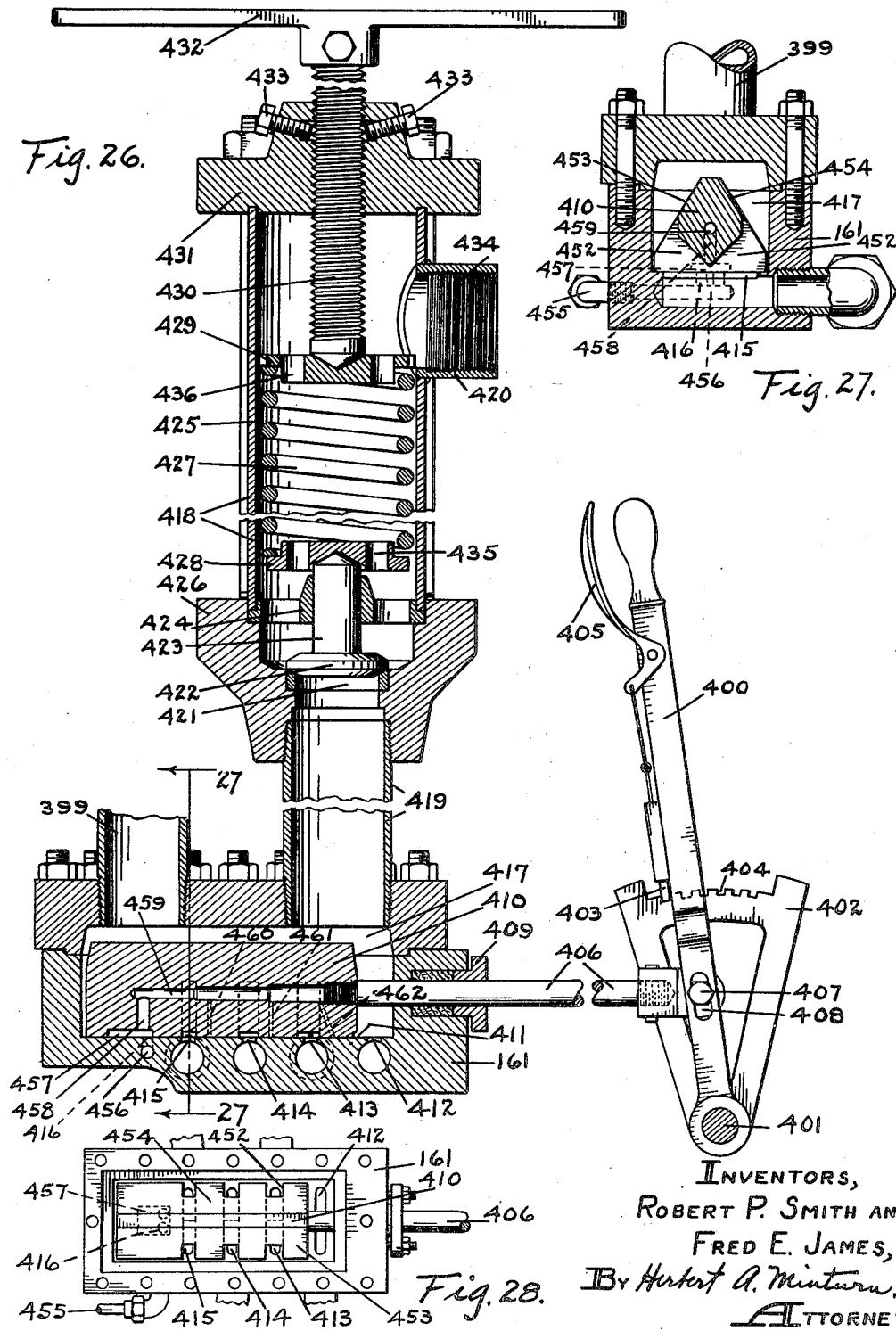

INVENTORS,
ROBERT P. SMITH AND
FRED E. JAMES,
By Herbert A. Minturn,
ATTORNEY.

Patented July 10, 1951

2,560,491

UNITED STATES PATENT OFFICE 2,560,491

CORK ROD FORMING MACHINE AND METHOD

Robert P. Smith and Fred E. James, Crawfordsville, Ind., assignors to The Hoosier Crown Corporation, Crawfordsville, Ind., a corporation of Indiana Application April 22, 1948, Serial No. 22,584

18 Claims. (Cl. 18—5)

This invention relates to an apparatus for the forming of cork material into an endless cylindrical or rod length from which length there may be sliced off uniform thickness of material to form discs in the nature of gaskets to be used as liners in crowns or bottle cap tops to effect a sealing between the crown and the bottle mouth. One of the big problems in the forming of these crown discs out of cork material is to form a disc which will be uniform in cork particle arrangement and also have a uniform density throughout its entire area, otherwise an imperfect seal is likely to result. It is necessary that the entire area and thickness of the disc be free of voids or zones wherein there is less cork than in adjacent zones or areas so that when the crown is compressed or rather pressed on the end of the bottle, there will be a uniform pressure throughout the entire contact of the cork disc around the edge of the mouth of the bottle.

One of the important objects of the present invention is to form a continuous length of cork as a rod from which the individual discs may be sliced into uniform thicknesses, and in each of which discs there is a homogeneous arrangement of particles and also a constant density throughout the entire cross-sectional area. In other words there is promoted a uniform structure causing a better sealing when in use between the bottle crown and the bottle.

A further important object of the invention is to provide an extremely flexible control of a hydraulic system of operation of the entire machine.

In reference to prior known devices for forming cork rod, once the machine is started in operation, it is almost necessary to continue it throughout the 24 hours of the day rather than to shut it down, because of the cost involved in starting the line up, and the many things such as clearing the machine and cleaning it out when you stop it. Now, with our new hydraulic operated machine, all of these problems are eliminated. The machine can be started and stopped at will. The machine can be emptied by the simple process of passing through empty molds in the machine—in other words, by merely shutting off the cork supply and continuing the machine in operation until all of the cork has been ejected from the cooling section of the conduit. Therefore, our machine can be started each morning and operated for 8 hours or 16 hours, whatever the case might be, and put the operation to no disadvantage as compared with an extrusion process. Nevertheless, when a rod of cork from 20 to 24 inches long, may be formed as in heretofore employed processes, a loss of probably as much as ¼" on each end of that rod, sometimes as much as 1", which is a direct throw-away, is had. Through the cutting operation an accumulation of waste is gained and the waste in the use of short rods becomes such a factor that it is impossible to put it back through and reprocess, whereas with this new method of forming a continuous rod of cork of uniformity of density and the cutting of the discs with practically no waste, there is had a great advantage, with a direct and very definite saving in material and labor.

Figures 6, 7, 8:
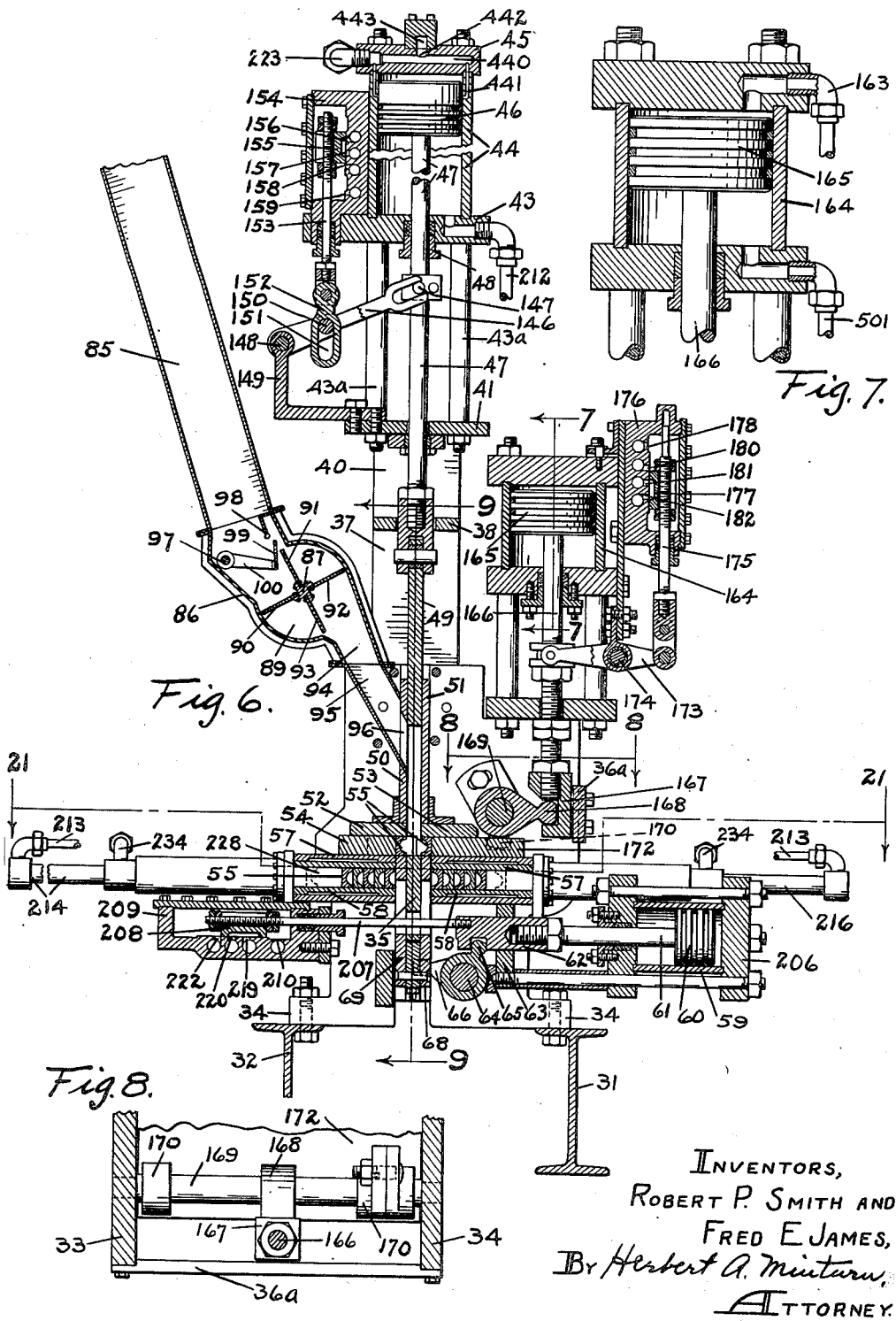
Figure 18:
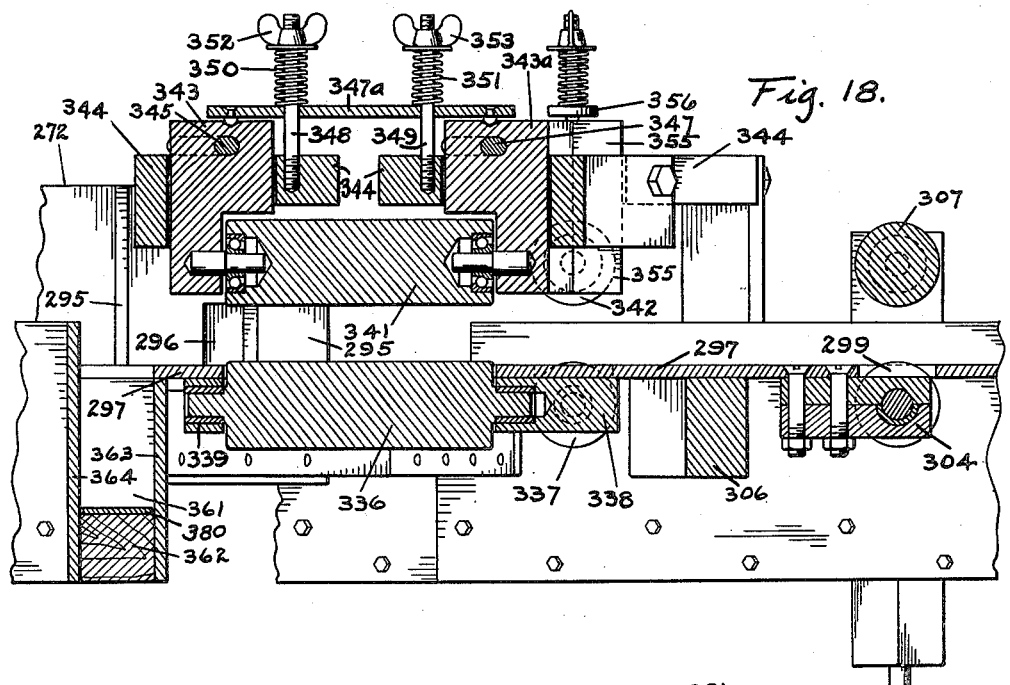
Figure 19:
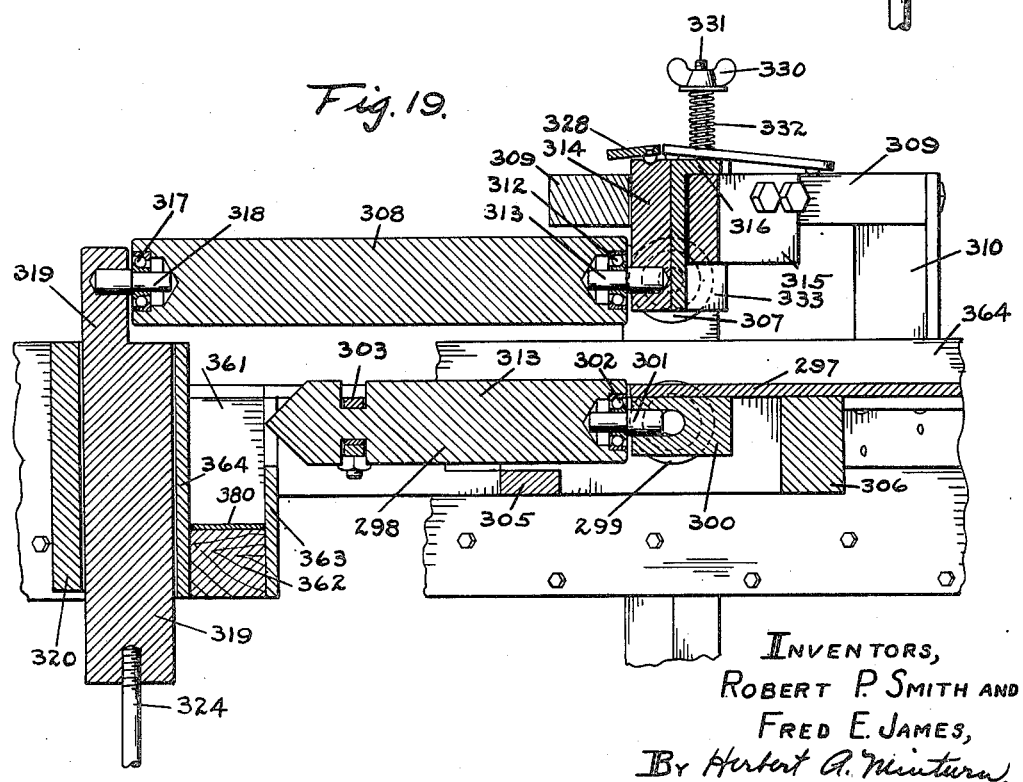
Figure 29:
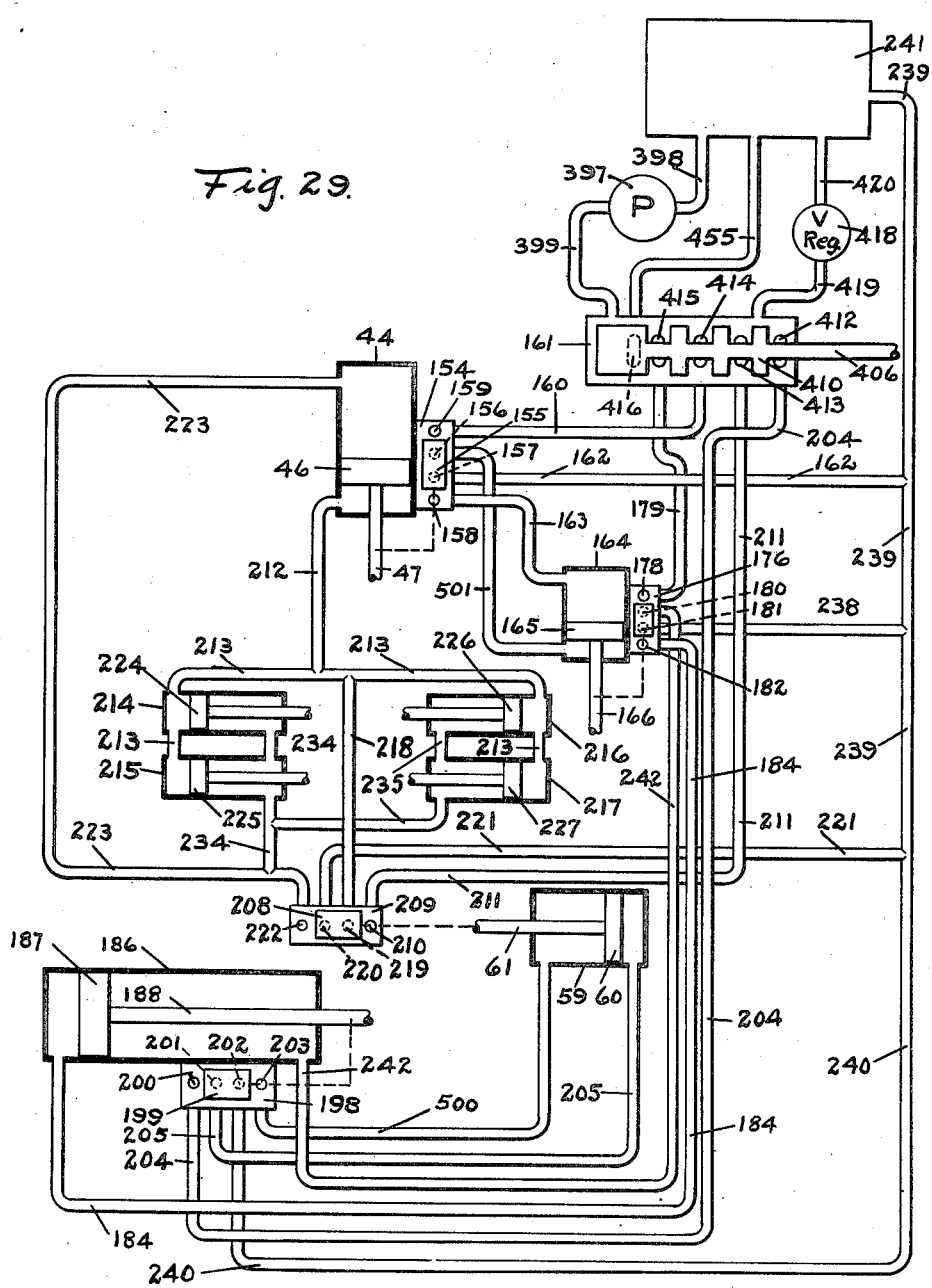

These and many other objects and advantages of the invention will become apparent in the following description of one particular form of the invention as illustrated in the accompanying drawings, in which, Fig. 1, is a view in side elevation in a diagrammatic representation of a structure embodying the invention;

Fig. 2, is a top plan view of that structure;

Fig. 3, a view on an enlarged scale from the rear side in respect to Figs. 1 and 2 of the cork compressing unit;

Fig. 4, a detail on a further enlarged scale on a diametrical section on the line 4—4 in Fig. 3 through to the mold strip lift cylinder;

Fig. 5, a detail on a further enlarged scale in central vertical section through the upper portion of the top pressure cylinder;

Fig. 6, a view in vertical section on the line 6—6 in Fig. 3;

Fig. 7, a vertical section on an enlarged scale through the side pack cylinder on the line 7—7;

Fig. 8, a detail in horizontal section on the line 8—8 in Fig. 6;

Fig. 9, a vertical section on line 9—9 in Fig. 6;

Fig. 10, a horizontal transverse section on an enlarged scale on the line 10—10 in Fig. 9;

Fig. 11, a transverse vertical section on the line 11—11 in Fig. 10;

Fig. 12, a vertical section on the line 12—12 in Fig. 11;

Fig. 13, a similar section to that shown in Fig. 11, but spaced further along the heating—cooling conduit to be in that portion thereof across the cooling part, as indicated in that position by a transverse plane on the line 13—13 in Fig. 14;

Fig. 14, a view in side elevation of the discharge end of the device and showing the return mold strip belt apparatus;

Fig. 15, a side elevation of the driving end of the mold strip return belt;

Fig. 16, a view in top plan of the discharge end of the machine;

Fig. 17, a bottom plan view of that end structure shown in Fig. 16;

Fig. 18, a view in vertical section on the line 18—18 in Fig. 16;

Fig. 19, a view in vertical section on the line 19—19 in Fig. 16;

Fig. 20, a view in vertical section on the line 20—20 in Fig. 3;

Fig. 21, a view in horizontal section on the line 21—21 in Fig. 6;

Fig. 22, a detail in side elevation of the granular cork material feed into the molding machine;

Fig. 23, a view in side elevation of the reverse side of the valve housing as shown in Fig. 22;

Fig. 24, a detail on an enlarged scale in section on the line 24—24 in Fig. 22;

Fig. 25, a view in side elevation of the shaft driven by the cylinder illustrated in Fig. 4 to control the lift of the mold strips and also to control the feeding mechanism shown in Fig. 22;

Fig. 26, a detail on an enlarged scale in central vertical section through a combined primary hydraulic valve control and a constant pressure maintenance device;

Fig. 27, a view in transverse vertical section on the line 27—27 in Fig. 26;

Fig. 28, a diagrammatic view in top plan with the cover removed of the major control valve illustrated in Fig. 26; and Fig. 29, a hydraulic flow and operating diagram.

Like characters of reference indicate like parts throughout the several views in the drawings.

Upon any suitable floor area 30, Figs. 1 and 2, there are positioned spaced apart sills 31 and 32. Across the top sides of these sills 31 and 32, herein shown as I beams, there are fixed in longitudinally spaced apart relation a pair of side plates 33 and 34. These plates 33 and 34 support therebetween a bolster 35, Fig. 9, this bolster consisting in the present showing of a vertically disposed metal plate. Across the back sides of the plates 33 and 34 is attached a tie bar 36a, Fig. 3.

From the outer sides respectively of the side members 33 and 34 there extended upwardly the frame members 36 and 37. The upper ends of these members 36 and 37 are interconnected by a horizontally disposed transverse header 38. Then from the outer ends of this header 38 and as continuations of the frame members 36 and 37 there are fixed the diagonally inwardly extending braces 39 and 40 respectively to in turn interconnect by their upper ends with the base member 41.

Secured by their lower ends to this member 41 are a number of posts 42 and 43a which extend vertically upwardly in spaced relation to engage by their upper ends with the lower cylinder head 43 of the top pack cylinder 44. This cylinder 44 extends on above the lower head 43 to be closed by the top head 45.

The cylinder 44 contains a piston 46 from which extends downwardly a piston rod 47 to pass through the lower head 43 through a packing gland 48 and to extend on down through a guide provided in the member 41, and to detachably connect with a packing plunger 49. This packing plunger 49 is generally rectilinear in shape and is received between front and back guiding plates 50 and 51. These plates extend across and have their ends attached to the end plates 33 and 34. The lower ends of these side plates 50 and 51 are secured in fixed relation to the horizontally disposed members 52 and 53 which in turn have their ends secured to the respective plates 33 and 34. The members 52 and 53 are spaced apart a distance equal to the spacing between the plates 50 and 51, Fig. 6.

Under the transverse member 52 is held in fixed relation a mold strip retaining and locating bar 54, the ends of which are secured to the plates 33 and 34.

A plurality of mold strips 55 are employed. Each of these mold strips 55 is identical with all other mold strips both as to shape and as to all dimensions. Each mold strip 55 is generally rectangular in shape in cross-section with a semi-cylindrical cavity 56 entering the strip from one vertical face and having the outer margins of that cavity feathering as much as may be practical to stand up in usage into the top and bottom faces of the strip itself. Each mold strip 55 has a length which will permit it to fit slidingly between the plates 33 and 34, Fig. 9. The closer the margins of the cylindrical cavity designated by the numeral 56 coincide with the top and bottom faces of the mold strip 55 the less waste there will need to be trimmed from the finished rod of cork. This will become apparent later in the description.

Mold strips 55 are fed (by means herinafter to be described) in a longitudinal manner one after the other across from the outer side of the plate 34 between top and bottom heated plates 57 and 58 respectively. These plates 57 and 58 extend horizontally in spaced apart relation to interconnect by their respective ends with the vertical members 33 and 34. The spacing apart of these plates 57 and 58 is made to be such that the mold strips 55 may be slidingly received freely therebetween. As best indicated in Fig. 21, the mold strips 55 enter over the bottom plate 58 in fore and aft spaced relation, on lines parallel one with the other and substantially equally distant from the center line of the bolster 35.

On the rear side of the structure, and above the sill 31, is mounted a horizontally disposed mold strip lifting actuating cylinder 59. Within this cylinder 59 is a piston 60 having a connecting rod 61 fixed thereto and extending horizontally toward the bolster 35 to interconnect with a head 62. This head 62 is slidingly guided by a transverse bar 63 interengaged by its end portions with the plates 33 and 34.

Rockably carried between the plates 33 and 34 is a horizontally disposed shaft 64. This shaft 64 is below the head 62, Fig. 6, and has fixed thereon a lever 65 the outer end of which is rounded to fit within a slot provided in the underside of the head 62. Referring to Fig. 25, the shaft 64 is viewed from the underside so that the underside portion only of the lever 65 is shown there which surrounds and engages the shaft 64. This lever 65 is substantially centered longitudinally of the shaft 64.

Then spaced from each side of the lever 65, longitudinally of the shaft 64, are levers 66 and 67 respectively. The free ends of the levers 66 and 67 are spaced around the shaft 64 in relation to the free end of the lever 65 a distance exceeding slightly 90 degrees.

Referring to Figs. 6 and 20, and also Fig. 9, there is mounted in sliding relation on each side of the center bolster 35 vertically disposed plates 68 and 69 which are interconnected across their lower portions by an intervening block 70. This block 70 slightly exceeds the thickness of the bolster 35 so that the plates 68 and 69 may freely slide vertically along the respective outer faces of the bolster 35. The interconnection of the plates 68 and 69 with the block 70 is made in any suitable manner, herein shown as by a plurality of rivets 71. The plate 69 is provided with recesses 72 which match pockets 73 and 74 provided in the intervening block 70, Fig. 9. The vertical ends of these plates 68 and 69 are guided in vertically disposed grooves 73a and 74a provided in the plates 33 and 34.

In to these recesses 72 in the plate 69, extend the ends of the levers 66 and 67. Thus by reciprocation of the piston 60, the shaft 64 is rocked to alternately raise and lower the plates 68 and 69 in unison. When these plates 68 and 69 are in their lowermost positions, their edge portions will be at levels not to exceed the plane of the top faces of the lower top plates 58, a plate 58 being positioned on each side of these vertically disposed plates 68 and 69 a sufficient distance apart to allow these plates 68 and 69 to enter freely therebetween, Fig. 20. In the uppermost permissible limit of travel of these plates 68 and 69, mold strips 55 slide laterally over the plates 58 toward the bolster 35 when these elevating plates 68 and 69 are in their lowest positions, and will then have carried the respective mold strips 55, one over each plate 68 and 69, upwardly along and in sliding contact with the respective vertical faces of the bolster 35, and thereabove until the top faces of the two respective strips 55 will come into contact with the underside of the transverse member 52 on the one side, and against the fixed transverse member 53 under the plate 51 on the other side. As indicated in Fig. 20, these two mold strips 55 will be presented with their concave faces opposite one another, but spaced apart the thickness of the bolster 35. In order that the upward travel of the plates 68 and 69 be perfectly adjusted to prevent damage to any of the parts, and still to correctly present and position the mold strips 55 against the undersides of the members 52 and 53, these are provided travel limits in the nature of adjustable set screws 76, Fig. 9, herein shown as two in number, and as screw-threadedly passing vertically upwardly through the spacing block 70 to have upper ends come into contact with the underside of the bolster 35. Furthermore the travel of the shaft 64 is controlled by relative adjustment of the head 62 on the end of the connecting rod 61, and further adjustment is provided to equalize or rather present the levers 66 and 67 at exactly the same angles to the plates 68 and 69 by means of an adjustment of the lever 67. This adjustment is best shown in Figs. 22 and 25 wherein the lever 67 is rockably carried by the shaft 64 and has an ear 77 extending outwardly along an ear 78 of a lever fixed to the shaft 64. The two members 67 and 79 are interconnected in adjustably fixed positions by means of a bolt 80 carried through the ears 77 and 78, through a slot 81 in the ear 78, and drawn up snugly to the desired adjustment.

Separately from the entire machine forming the invention herein described, the cork material is milled to the desired particle sizes and is intermixed with a comminuted, dry form of a synthetic resin or thermo-setting plastic. The plastic material is used to form the final bond between the cork particles in the finished cork rod. This previously prepared cork material is fed down the chute 85 by gravity to a measuring or metering compartment 86. This housing 86 has a horizontal length substantially equal to the space between the vertical frame plates 33 and 34.

A shaft 87 is rotatably carried to have its bearings in the end walls 88 and 89 of this housing 86. Inside of the housing 86 the shaft 87 carries a number of blades 90, 91, 92, and 93, to extend radially from the axis of the shaft. The outer edges of these blades come in close proximity to the inside wall of the housing 86, primarily on the upper and lower sides thereof. From the lower, rearside of the housing 86, there extends a downwardly and rearwardly turned mouth piece 94, from which leads a chute 95 diagonally downwardly to have its lower end open into a window 96 which extends entirely, horizontally across the plate 50.

In the upper forward portion of the housing 86 there is disposed, horizontally thereacross, a rock shaft 97. Across the opposite side of the upper portion of the housing 86 to extend within the discharge opening area from the chute 85 is positioned in a fixed manner an inverted L-shaped baffle 98. Then, as best shown in Fig. 6, a shiftable gate 99 is supported in a fixed manner by any such means as by a lever 100 from the shaft 97 so that upward travel of the gate 99 may permit it to travel under and back of the baffle 98. Downward travel of the gate 99 will or may bring it into the paths of the outer portions of the blades 90, 91, 92, and 93. The shaft 87 will be revolved in a clockwise direction, in respect to Fig. 6, so that as the blades come around up under the gate 99, it may be pushed upwardly to permit the blades to travel on past in their normal circumferential travel.

Referring to Fig. 22, the shaft 97 extends outwardly through the housing wall 88 to carry thereon in an adjustable manner a lever 101 which hangs downwardly to be in the path of an adjustable stop screw 102 which may be screw-threadedly advanced or retracted through a lug 103 attached to the housing wall 88, and locked in any desired position by means of the wing nut 104. This stop screw 102 limits the downward travel of the baffle 99.

Also in Fig. 22, there is shown mounted on the outer end of the shaft 87 first a dog wheel 105 having four notches 106 evenly spaced therearound, one notch for each of the blades 90, 91, 92, and 93 within the housing. This dog wheel 105 is fixed to the shaft 87. Outside of the wheel 105 there is revolubly mounted on the shaft 87 a hub 107 which is a part of a head 108, which in turn carries a pawl 109 to hang downwardly from an upper portion thereof and have its lower end in the path of the notches 106. A spring 110 normally urges the pawl 109 into contact with the peripheral portion of the wheel 105. This structure forms a ratchet mechanism such that by rocking the head 108 relatively upwardly and downwardly, the wheel 105 may be advanced in a clockwise direction the distance between two adjacent notches for each up and down travel. In the path of the lower portion of the head 108 is mounted a bumper pin 111 which is resiliently positioned by means of a spring 112 carried within a bracket on the side wall 88. Likewise there is a bumper pin 113 carried by the side wall 88 and normally urged upwardly by means of a spring 114, to have the pin 113 yieldingly positioned in the path of the surface 115 of the head 108 should it be rocked far enough around to come into contact with that pin 113.

A substantially vertically disposed shaft 116 rockably interconnects by its upper end by means of a pin 117 with the lower portion of the head 108, and rockably interconnects by means of a pin 118 with a lever member 119 at its lower end. This lever 119 is rockably mounted on a pin 120 supported by an upturned end of a bracket 121 in turn attached to the sill 32, Figs. 22 and 24.

From the shaft 64 there is carried in a generally downwardly projecting manner a lever 122 fixed to turn with that shaft. The outer end portion of this lever 122 is provided with a slot 123 through which a pin 124 may be adjustably fixed in reference to the radial length of the slot 123 in respect to the distance from the axis of the shaft 64. A connecting rod 125 is rockably positioned on the outer end of the pin 124 by one end and rockably connected through a pin 126 at the other end with a lever 127 that is normally free to rock around the pivot pin 120, Fig. 24. That is, the lever 127 is free to slide across the face of the lever 119, both being rockable on the same pin 120.

A latch arm 128 is rockable on the pin 129 carried transversely of the lever 127 to have a lower foot 130 normally entering through a window 131 in the lever 127 and a window 132 in the lever 119, so that both of these levers 119 and 127 will have to rock as a unit on the pin 120. An operating arm 133 extends from the latch arm 128 outwardly to have an upturned quadrant 134 to be in the path of a pin 135 normally urged downwardly from the end of the pin 129 by means of a spring 136. The outer end of the pin 135 is herein shown as being provided with a point 137 which may drop selectively into the notches 138, the latched position, or into the notch 139 which is the unlatched position as the arm 133 might be pulled upwardly in order to release the lever 127 from driving connection with the lever 119. This latch structure is provided so that the metering feed mechanism for supplying cork to the machine may be stopped at will should there be any difficulty encountered at any time, or should there be an absence of mold strips 55 in the packing positions.

Now in order to keep the shaft 87 from spinning during the ratchet operations, there is provided on the outside of the meter housing wall 89 a brake wheel 140, fixed on the shaft 87, around which is wrapped a length of brake lining 141, one end being fixed by the pin 142 in reference to the wall 89, and the other end of the lining 141 extending downwardly to a strap 143 from which is suspended freely a weight 144 to apply the desired amount of friction to the wheel 140 to prevent turning of the shaft 87 upon each of the ratchet steps being completed.

The entire mechanism is hydraulically operated, preferably by oil under pressure. The details of the hydraulic system will be explained later, but in order to follow through the steps consecutively, it will first be assumed that oil is being supplied under the required pressure into the head 45 of the cylinder 44 tending to urge the piston 46 downwardly. This downward travel of the connecting rod 47 from the piston 46 will carry the packing plunger 49 downwardly. Normally, as indicated in Fig. 6, the under edge portion of the plunger 49, when the piston 46 is in the upper part of the cylinder 44 will be located at or possibly slightly above the upper edge portion of the window 96. Furthermore it will be assumed that a definite amount of the cork material to which reference was above made will have been dropped down the chute 95 to enter into the space between the plates 50 and 51 under the plunger 49.

The piston 46 travels downwardly to force the plunger 49 downwardly until its lower end is at the bottom level of the two cross members 52 and 53, which is at the plane of the top surfaces of the two opposed mold strips 55 thereunder. Thus the cork material will be compressed throughout the entire longitudinal length of these two mold strips 55 to force the material within the opposing cavities of the strips. The amount of cork material dropped down the chute 95 is regulated to permit this complete compression of the cork material within that space. As is noted in Fig. 6, the two opposing mold strips 55 are spaced apart one from the other the thickness of the plunger 49.

During the downward travel of the connecting rod 47 as above described, this connecting rod 47 will lower a lever 146 by means of a pin 147 fixed to the connecting rod and entering the bifurcated end of the lever 146. This lever 146 is pivoted about the pin 148 in a fixed bracket 149 carried by the frame member 41, Fig. 6. This lever 146 is interconnected through a lost motion connection comprising a pin 150 carried through a slot 151 of a link 152 which is rockably attached to the lower end of a valve operating rod 153. This rod 153 enters the valve 154 to connect with a slide 155 which travels over a plurality of ports, 156, 157, and 158, leaving a fourth port 159 always open. This port 159 is always in communication with a pipe 160 which leads from a main control valve 161. By travel of the slide 155, oil entering the valve 154 may be selectively fed into either of the ports 156 or 158. The central port 157 serves as an exhaust port in communication with the pipe 162.

Therefore, when the slide 155 is pushed upwardly to uncover the port 158, oil carried into the valve 154 from the port 159 will flow outwardly through the port 158 into the pipe 163 which connects with the top of the cylinder 164.

Within this cylinder 164 is a piston 165 from which extends a connecting rod 166 vertically downwardly to interconnect with a head 167. This head 167 is immediately forward of the tie bar 36a. The head 167 rockably receives an outer end of a lever 168 which is fixed to a shaft 169 rockably carried horizontally between the side frame members 33 and 34. On this shaft 169 is one or more downwardly turned levers 170, herein shown as two in number, the lower ends of which levers engage within a recess 171 respectively provided in the top side of a side pack plate 172. The forward face of this plate 172 serves as the abutment against which the right hand mold strip 55, Figs. 6 and 20 bear. Furthermore this member 172 is slidingly fitted under the member 53 and over the top of the right hand hot plate 57, more clearly illustrated in Fig. 20.

Therefore, downward travel of the connecting rod 166, rocks the shaft 169, to force the packer plate 172 forwardly to carry the back mold strip 55 forwardly to come into contact and be stopped by contact with the forward mold strip 55. Oil exhausts from the lower end of the cylinder 164 through the pipe 501 to the port 156.

In so doing, the cork material which has been previously pressed from the top side is now compressed from the horizontal side as the two mold strips 55 come together. Obviously it is to be seen that this pressure is uniform entirely throughout the length of these mold strips both from the top side, and from the horizontal side.

Now, simultaneously with the down travel of the connecting rod 166, there is rocked a lever 173 about a central pivot pin 174 so that the other end of the lever 173 is rocked upwardly to push upwardly a valve actuating rod 175 which enters the valve 176 to move the valve slide 177.

In this valve 176, there is a port 178 which is never covered by the slide 177, and it is through this port 178 that oil under pressure enters the valve from the pipe 179 which leads from the valve 161. In sequence from that feed supply port 178, are spaced ports 180, 181, 182 which are subject to the control of the slide 177. When the slide 177 is pushed upwardly in the action of the connecting rod 166 just described, oil entering the valve through the port 178, will then flow through the port 182 and out into the pipe 184 which interconnects through the head 185 at the outer end of a horizontally disposed cylinder 186 which may be termed the mold ejector cylinder. Referring primarily to Fig. 9, this cylinder 186 is mounted to extend horizontally outwardly from the outside of the side plate 33. A piston 187 carried within the cylinder 186 has a piston rod 188 extending through the other head 189 to a longitudinally adjustable head 190 which is in the direct path of the then side by side abutting mold strips 55 containing the compressed cork therewithin.

As the piston 187 is forced toward the head 189 by the oil inflowing from the pipe 184, this head 190 travels against the ends of those combined or abutting mold strips 55 to carry them on through the side plate 34, through a window 191 provided therein, which is of just sufficient cross sectional area as to permit the two mold strips to be in sliding contact with the entire contour of that window so that the strips may not tend to separate laterally one from the other. These specific mold strips 55 are pushed into a tunnel 192 so that their ends will clear the inner face of the plate 34. The length of the cylinder 186 is made to be such as to permit that required degree of travel of the connecting rod 188. Then when that operation has been completed, those two mold strips 55 come to rest and remain for an interval in a stationary position within this tunnel 192.

Just before the piston 187 reaches its extreme limit of travel to the right, in reference to Fig. 9, it will strike a pin 193 which is slidingly entered through the head 189. This pin 193 through a block 194 is fixed to a slide rod 195, to which in turn is clipped a valve stem 196 through the clip 197. This valve stem enters the valve 198 to shift a head 199 by travel thereof. Within the valve 198 and outside of the travel of the slide 199 is provided a port 200 from which leads a pipe 204 to the main control valve 161. Oil pressure is supplied from the valve 161 normally through this pipe 204 to enter the valve 198.

Upon the extreme travel of the piston 187 to the right, Fig. 9, the slide 199 will be shifted to uncover a port 201 and to interconnect ports 202 and 203. In other words ports 200 and 201 are then interconnected so that oil entering the valve 198 may flow out the port 201.

From the port 201 leads a pipe 205 to enter the outer head 206 of the cylinder 59. Pressure against the outer face of the piston 60 will cause the shaft 64 to lower the lift plates 68 and 69. Simultaneously with this action, there is the further action by means of a valve rod 207 secured to the head 62 actuating a slide 208 within the valve 209.

Within this valve 209, is a port 210 which is never covered by the slide 208, and which is interconnected with the pipe 211 coming from the control valve 161, to supply oil under pressure to within the valve 209.

However, previously to this action, and simultaneously with the down travel of the piston 46 in the cylinder 44, oil under the piston 46 was forced out through the bottom of the cylinder through the pipe 212 to enter into a pipe 213 which interconnects respectively across the outer ends of two pairs of side mold strip feed cylinders 214, 215 in the one pair, and 216 and 217 in the other pair. There is also a pipe 218 interconnecting the pipe 213 with the port 219 in the valve 209 so that when the piston 60 is in the position as indicated in Fig. 6, the port 219 is interconnected then with the port 220, from which leads the pipe 221 to exhaust oil. While at this point, it is to be noted that when the slide 208 is in the position as indicated both in Fig. 6 and Fig. 29, a port 222 and covered so that the oil pressure may flow from the port 219 and out to port 222 through the pipe 223 and into the top head 45 of the cylinder 44 to supply that pressure which was initially mentioned in the beginning of describing the downward travel of the piston 46.

Still referring to that initial action when the piston 46 was traveling downwardly, the various pistons 224, 225 in the cylinders 214 and 215, and pistons 226 and 227 in the cylinders 216 and 217 were being driven respectively toward each other to carry, Fig. 21, the rectilinear plungers 228, 229, on the left hand side in respect to Fig. 21, and 230 and 231 on the other side, all across the top side of the under hot plates 58 and below the top hot plates 57. This travel of these respective plungers urges the mold strips 55 into abutment one against the other and carries them slidingly over the plates 58 to the sides of the lift plates 68 and 69. Since but little pressure is required to carry out this travel, the pipe 213 is bled through the pipe 218 into the exhaust line 221 as has just been described during this operation.

Now returning to the position of the slide 208 in the left hand position, that is when the piston 60 is carried to the left hand end of the cylinder 59 in respect to Fig. 6, ports 220 and 222 are then interconnected and the port 219 is opened to communication with the port 210 for oil supply pressure.

The sequence of operations so far described is then ready to be repeated. It is to be noted in further reference to this valve 209 that when the slide 208 is in the position indicated in both Figs. 6 and 29, and the port 222 is in communication with the oil pressure supply through the port 210, pressure is not only admitted through the pipe 223 to start the down travel of the piston 46, but it is also admitted through a branch pipe 234 which interconnects the inner ends of the cylinders 214 and 215 and by a side branch pipe 235 to the inner ends of the cylinders 216 and 217, whereby the pistons 224, 225, on the one hand, and 226, 227 on the other hand are driven outwardly in order to permit more of the mold strips 55 to travel across the then withdrawn plungers 228, 229, and 230, 231. In this respect however but one mold strip 55 can be fed across between the hot plates 57 and 58 on each side of the plates 68 and 69 by reason of the fact that the incoming ends of the two mold strips will strike the bumper blocks 236 and 237 respectively carried by the side frame plate 33. In other words mold strips tending to be fed inwardly will be held back by reason of their abutment with these strips then across the hot plates. Exhaust pressure from the cylinder 44 is maintained in the outer ends of the cylinders 214, 215 and 216, 217 in the proper timing relation so as to urge the entire quantity of mold strips 55 on both sides of the strips 68 and 69 respectively theretoward and to cause the innermost of those strips to enter over the top ends of the lift plates 68 and 69 so that they may be fed up in proper sequence all as above described.

Referring particularly to the diagram, Fig. 29, the port 181 of the valve 176 leads through the exhaust pipe 238 to the primary exhaust return line 239. Likewise the exhaust pipes 162, 221, and an exhaust pipe 240 leading from the port 202 of the valve 198 have a flow through this pipe 239 back to an oil supply reservoir 241.

When the piston 165 is returned to its upper position as indicated in Figs. 6 and 7, the valve stem 175 is then pulled downwardly so as to interconnect the ports 181 and 182 in the valve 176. This positioning of the valve slide 177 then permits oil flow from the pipe 179 through the port 178 and out through the port 180 through the pipe 242 into the cylinder 186 in order to force the piston 187 back outwardly to withdrawn the head 190 from across the path of the plunger 49, thereby returning the plunger 49 to that position as indicated in Fig. 9. When the piston 187 reaches its extreme outer end of travel, it will have come into contact with the pin 243, Fig. 9, which slidingly enters through the head 185, and pushed that pin back out to the position as indicated in Fig. 9, thereby pulling the rod 195 to which the pin 243 is interconnected by means of the block 244, so as to position the valve stem 196 and its slide 199 to the position as indicated in Fig. 9, ready for the return stroke of the plunger 190 when the proper time arrives.

This tunnel 192, as previously indicated, is a box-like construction, the cross-sectional area of which is rectangular and is of that area which will just permit the two mold strips when they are squeezed together to be pushed therethrough without permitting them to separate in any degree.

Referring to Fig. 10, after leaving the window 191 in the member 34, the mold strips are pushed one after another down the length of the tunnel 192, to have the strips consecutively pass the reverse travel stop members 245 and 246 which have ends entering diagonally inwardly and toward the direction of travel of the strips through the tunnel. These members 245 and 246 are respectively rockably mounted outside of the tunnel 192 in blocks 247 and 248 and are urged to have their ends extend into the tunnel 192, through windows 249 and 250 by means of springs 251 and 252. Thus when the mold strips are pushed passed the ends of these members 245 and 246, they can not travel backwardly in a reverse direction by reason of their ends coming into abutment with these members 245 and 246. At the same time by reason of the springs 251 and 252 being present, the members 245 and 246 may be pushed outwardly to provide the necessary clearance for travel of the strips therepast.

This tunnel 192 is rather long, having a length in most instances of around 60 feet, of which the initial length of some 40 feet will be heated, and the remaining length cooled. As previously indicated, the cork granules are intermixed with the plastic or synthetic resin which requires heat to cause it to flow and set. Moreover the heat is applied to the combined mixture of cork and plastic while it is compressed within the mold strips to cause vapor or steam to be formed which will tend to release the plastic and cork from clinging engagement with the walls of the mold strips. In other words, the heat will cause the steam to be formed to supply moisture which will come into contact with the metallic walls of the two opposing mold strips 55 and thereby in effect prevent the plastic from adhering to those metal walls.

As best indicated in Figs. 11 and 13, the tunnel 192 is fabricated from top and bottom square bars 253 and 254 which are bolted into position in spaced vertical relation between channel members 255 and 256. The sectional view shown in Fig. 11 is one through the heated portion of the tunnel 192 and the view shown in Fig. 13 is a sectional view through the cooled portion of the tunnel 192.

Side plates 257 and 258 are compressively drawn up respectively against the legs 259 and 260 of the member 255 and the leg 261 and 262 of the member 256.

The top and bottom bars 253 and 254 are held in fixed vertically spaced apart relation one with the other between the channel members 255 and 256 by means of the cross bolts 259a and 263. Then the side plates 257 and 258 are held against the outer ends of the channel member legs by means of the top and bottom sets of bolts 264 and 265, Figs. 11, 12 and 13. These channel members 255 and 256 as well as the side plates 257 and 258 together with the intervening top and bottom bars 253 and 254 are made in relatively short lengths and assembled in units with end blocks 266 and 267 forming closures between the plate 257 and the channel 255 so as to form a compartment 268 therebetween, this compartment being sufficiently tight so as to hold any suitable fluid such as oil which will transmit heat to the wall of the channel member 255.

In the same manner, Fig. 10, there are closure blocks 266 and 267 at the respective ends of the plate 258 closing off the space between the plate 258 and the wall or web of the channel member 256 to form the closed compartment 271 therebetween likewise sufficiently tight to hold the heating medium or heat transferring medium such as oil.

Such assemblies generally designated by the numeral 272 are abutted end to end to form the continuous tunnel 192 therethrough so as to permit a flexibility in achieving the desired length of tunnel 192 which may be used. Furthermore breaking the tunnel up into these separate assemblies permits the formation of fluid tight compartments in a more controlled manner. Each of the units 272 are joined end to end by means of cap screws 274 carried through adjacent closure blocks 266 and 267 on the one side and like blocks on the other side, Fig. 10.

Referring to Figs. 11 and 12, on the inner side faces of each of the plates 257 and 258 are fixed steam circulating coils 275 and 276 respectively, these coils having outwardly extending pipe connections for the inlet and exhaust of the steam therethrough. Passage of steam through these coils will heat the oil within the compartments between the plates and the channel members so as to transfer heat to the walls of those channel members 255 and 256 respectively and thereby transmit heat to the mold strips 55 which are being pushed through the tunnel 192 therebetween. Steam is supplied from any suitable source such as from a boiler 277, Fig. 1, through two supply pipes 278 which by branch lines 279 connect with the top inlet pipes 280 and 281 respectively of the coils 275 and 276. A return flow steam line 282 interconnects with the various outlet pipes 283 and 284 so that the condensate from the coils 275 and 276 may be returned to the boiler 277. Each of the various oil containing compartments between the side plates 257 and the channel member 256 on the one side, and 258 and the channel member 256 on the other side is provided with an oil filler pipe 285, these pipes being normally closed after the filling operation. Then each of these same compartments is supplied with a drain pipe 286 and 287 respectively, Fig. 11. These pipes 286 and 287 likewise are normally closed.

Now in that continuing length of the tunnel 192 which is to be cooled or refrigerated, in the form herein shown, the coils 275 and 276 are preferably omitted and each of the plates 257 and 258 are provided with connecting inlet and outlet circulating brine pipes 287a and 288 respectively. As indicated in Figs. 1 and 2, there are main supply brine circulating pipes 289 from which leads the pipes 287a and 288 to each one of the sections 272 of the tunnel. Then also there are a series of pipes 288a leading from these sections 272 into a common return pipe 290 which in turn is carried back to the source of the coolant.

In this manner, the cooling liquid is circulated through these compartments of which the members 255 and 256 serve as the inner walls forming boundaries of the tunnel 192 so as to heat from the mold strips 55 passing therethrough may be transferred to that liquid and carried away. In this portion of the tunnel 192, the plastic which has previously been heated to set, is cooled down so that it becomes more rigid and approaches room temperature or perhaps slightly therebelow.

Across the outer end of the last tunnel assembly 272, Figs. 16 and 18, there is a plate 295 secured in position having a window or doorway 296 whose opening coincides with the marginal perimeter of the tunnel 192, and from which doorway 296 emerges the mold strips 55 with the cork filled compressively therebetween, and by this time set in condition for further treatment. From the under margin of the doorway 296, there extends outwardly therefrom a horizontally disposed platform 297. The mold strips 55 are pushed centrally outwardly over this floor 297 until their outer ends come into contact with the inner end portions of rollers 298 and 299 which are mounted primarily below the floor 297 and extend only slightly above the top side of the floor, Fig. 19. These rollers 298 and 299 are mounted to be freely revoluble on axes at 45 degrees to the edge portions of the floor 297. The inner ends of the axis of each of these rollers 298 and 299 intersect on the longitudinal center line of the floor 297.

As indicated in Fig. 19, there is a center bearing block 300 from which extends a pin 301 axially into each end of the respective rollers 298 and 299 to enter a ball bearing 302 carried within the end of the roller, and around which bearing 302 the roller may freely revolve. The outer ends of these rollers 298 and 299 are respectively carried in bearings 303 and 304, Fig. 17. Since the floor 297 must be cut away to permit the upper sides of the rollers 298 and 299 to extend therethrough and slightly above the level of the floor 297 as above explained, the cut away portions of the floor are bridged across from the under side by means of the supporting bars 305 and 306. These bars 305 and 306 are of course cut away on their top sides to permit the rollers 298 and 299 to pass thereacross freely, and the bars 305 and 306 are secured to the underside of the floor 297 in any suitable manner such as by welding.

Immediately above these under rollers 298 and 299 are located rollers 307 and 308 to have their axes respectively in vertical planes including the axes of the rollers 298 and 299. There is a fixed horizontally disposed bridge bar 309 extending across the floor 297 at a distance thereabove. The outer ends of this bar 309 are supported respectively by the posts 310 and 311.

The inner end of the roller 308, Fig. 19, is revolubly supported through a ball bearing 312 which is mounted on the pin 313 that is fixed within a bearing block 314. This bearing block 314 is vertically slidable through the outer portion of the bridge bar 309, and is retained thereagainst by means of the bearing plate 315. To limit the extent of the down travel of the block 314, there is an overhanging lip 316 provided to strike the top side of the member 315.

The outer end of the roller 308 is revolubly supported by means of a bearing 317 that is mounted on the end of the pin 318 which is fixed in a vertically slidable post 319 vertically carried through the bracket 320. A stop pin 321 extends laterally from the post 319 to be in the path of the top end of a stop member 322 which is fixed on the outer side of the structure carrying the floor 297, Fig. 14. From the lower end of this post 319 there is suspended a weight 323 by means of an interconnecting rod 324, Fig. 14. By means of the use of the weight 323, the outer end of the roller 308 may be yieldingly lifted. Also the inner end of the roller 308 may be yieldingly lifted, but the resistance applied thereto is by means of a spring 325 which is mounted around a post 326, on the upper end of which is carried screwthreadedly a thumb screw 327 to be adjustably carried down against the top end of the spring 325 to compress it against the retaining plate 328, Fig. 19. This plate 328 is laid across the top side of the bridge member 309 to bear by an outer end thereon, and is carried across the top side of the bearing block 314 to rest thereon. The post 326 is mounted in a fixed manner to the bridge member 309 so that it remains stationary, while the plate 328 may be yieldingly pushed upwardly if the roller 308 is lifted accordingly.

Normally the space between the lower roller 298 and the upper roller 308 is less than the vertical height of the mold strip 55 so that when the mold strip strikes these two rollers, the upper roller 308 will be yieldingly lifted to apply some pressure downwardly on the strip to cause it to maintain contact between the two rollers. The other roller 307 is mounted in exactly the same manner as is that mounting of the roller 308, and therefore a detail description of its mounting is unnecessary. The inner end of this roller 307 is held in its lower position yieldingly by the spring compressively inner-engaging by its respective ends against the top adjusting thumb screw 330 on the post 331 and the plate 332 which is laid across the top side of the member 309 to receive the post 331 therethrough loosely and have its inner-end there on top of the bearing block 333 which carries the inner-end of the roller 307.

Therefore when the outer ends of the two mold strips 55 are pushed between these pairs of upper and lower rollers, the outer ends of these mold strips 55 are spread apart as indicated in Fig. 16 by reason of the diagonally aligning of these particular rollers. Now when this happens, the molded cork rod 335, Fig. 16, will pass on between the rollers without coming in contact with any of them. However the cork rod 335 will be continuously fed on across the floor 297. This cork rod 335 will be in a continuous length by reason of the fact that as one pair of mold strips 55 is pressed against the forward set of mold strips 55 under pressure of the ram 190, the slight amount of cork and plastic material which will protrude normally from the ends of these two held together mold strips in both instances will bond together with the cork material in both the fore and aft pairs of mold strips 55. There may be a slight annular fin left between these ends, but it is insignificant and may be easily removed later.

As these outer ends of the mold strips 55 are spread apart, the rear portions of these same strips will be carried diagonally and laterally outwardly to come into engagement with other rollers. Spaced between the plate 295 and the forward pairs of rollers 307 and 308, with the under rollers 299 and 298, there are rollers 336 and 337 mounted on the under side of the floor 297 to extend by upper portions through cut-away sections of the floor 297 to have these upper sides extend slightly above the top face of the floor 297. These rollers 336 and 337 are mounted to have their axes respectively parallel to the axes of the rollers 298 and 299, Fig. 17. The inner ends of these rollers 336 and 337 are revolubly carried by a central bearing block 338 secured to the under side of the floor 297. The outer ends of these same rollers are revolubly carried in fixed bearing members 339 and 340.

Spaced above the floor 297 to have their axes in the common vertical planes with the axes of the rollers 336 and 337 are rollers 341 and 342. These rollers have their inner adjacent ends spaced apart sufficiently so that when the mold strips 55 are being ejected through the plate 295, and before they reach the forward rollers above described, these rollers 341 and 342 will not be contacted by those strips. As above indicated, the rollers 341 and 342 will be contacted by these strips when they are spread apart by their forward ends to come into some such positions as indicated in Fig. 16.

Both of these upper rollers 341 and 342 are resiliently mounted to permit vertical travel above and away from the floor 297. The roller 341 has its outer end revolubly carried in a bearing block 343 which is vertically shiftable in a fixed bridge member 344 which extends horizontally across and in spaced relation above the floor 297 and primarily above the rollers 341 and 342.

Trunnions 345 and 346 extend from opposite sides of the bearing block 343 to limit the down travel of the block 343 through the bridge member 344. In the same manner, the inner end of this roller 341 is carried by a bearing block 343a that is free to slide vertically through the member 344 and is limited in its down travel by the through pin 347 which contacts the upper face of the member 344 when the bearing block 343a is in its lowermost position. Both of these bearing blocks 343 and 343a are yieldingly retained in their lowermost positions by means of a plate or strap 347a which is laid across to rest on top sides of the bearing blocks 343 and 343a, Fig. 18, and is yieldingly retained thereover by means of the two screw-threaded rods 348 and 349 both fixed to the bridge member 344 and freely passing through the strap 347a above, to carry respectively the springs 350 and 351 which are adjustably pressed against the top side of the strap 347a by the respective thumb nuts 352 and 353.

In like manner, the roller 342 is carried between the vertically shiftable end bearings 354 and 355 normally retained in their lowermost positions by the strap 356 which is retained against the top sides of those bearing blocks 354 and 355 in exactly the same manner as are the bearing blocks 343 and 343a.

As succeeding mold strips 55 have their forward ends engaged between the upper and lower rollers 37, 299, 308, 298, to have their forward ends spread apart and bring the rear portions of those strips into engagement between the corresponding pairs of rollers 336, 341, and 337, and 342, these succeeding mold strips will push the preceding strips laterally and in a diagonally traveling manner across the floor 297 until they come to the outer lateral edges thereof.

Along each lateral edge of the floor 297 there extends in parallel relation thereto, troughs 360 and 361 respectively. The floors of these troughs are dropped down below the level of the top side of the floor 297 a distance exceeding the vertical height of each of the mold strips 55. The floor 362, Figs. 18 and 19, is made preferably out of wood members and are secured between vertically spaced apart metal walls 363 and 364. The wall 364 extends a distance above the level of the floor 297, this wall 364 being the outer wall.

When there are a sufficient number of the mold strips 55 carried outwardly to the respective edges of the floor 297 in the manner above indicated as conveyed by the respective sets of rollers described, the outermost of these mold strips 55 will drop downwardly into these troughs. Normally the extreme outer longitudinal ends of these outer mold strips 55 will strike against the upper portions of the outer walls 364 of the troughs and thus be steadied until the rear portions of those strips come out to the edge of the floor 297, whereupon the respective mold strips will drop vertically downwardly into the troughs to have the concave sides located on those sides which will be directed toward the edges of the floor 297. In other words the concave sides of these mold strips 55 will be directed toward the wall 363 in each instance. The spacing between the walls 363 and 364 is made to be such that the mold strips 55 are received therein freely, but at the same time will not permit the strips to turn over on their sides.

These troughs 360 and 361 extend from the extreme outer end of the floor 297 entirely back to the vertical frame member 34, Fig. 15. As indicated in Fig. 21, these troughs 360 and 361 open by their ends adjacent the frame member 34 through the openings therein designated by the numerals 365 and 366, these being the openings through which the mold strips 55 travel to slide out onto the hot plates 58. As above indicated, the ends of these mold strips 55 coming through these openings in the member 34 will normally abut the feed plungers 228 and 230. Extending across under the troughs 360 and 361 is an axle 367 supported on a framework 368 that is carried by the ends of the sills 31 and 32. This axle 367 is mounted to rotate on this frame 368 and carries on respective ends within the framework 368 the drive wheels 369 and 370 respectively. As indicated in Fig. 15, a motor 371 is carried by the frame 368 to drive through a chain 372 a sprocket wheel 373 which is fixed on the axle 367 between the drive wheels 369 and 370. An idler shaft 374 is also carried transversely across the frame 368 to have the idler wheels 375 and 376 fixed thereto. The chain 372 is carried upwardly from the under side of the sprocket wheel 373 to travel across the top side of a sprocket 377 which is fixed to the idler shaft 374. Therefore, when the motor 371 is operating, two axles 367 and 374 will be driven to carry the respective wheels accordingly. In the view shown in Fig. 15, the drive wheel 370 is turning in a counterclockwise direction.

Both the drive wheels 369 and 370 are flanged on both sides to have an intervening friction surface 378 carried therearound, Fig. 15.

Along the floors of each of the troughs 360 and 361 are carried steel belts 379 and 380 respectively. These belts are made to have a width which will just permit them to slide between the vertical side walls of the troughs. As indicated in Fig. 15, the steel belt 380 is carried down through an opening through the floor of the trough 361 to wrap around the drive wheel 370 so as to be pulled along by the frictional surface 378. The belt 380 wraps around the wheel 370 and then comes up and over the idler pulley 376 and continues on back out by an understretch below the trough to be carried down around the underside of a pulley 381, Fig. 14. The belt 380 is carried around this pulley and from its top side enters the trough 361. The belt 379 which is carried through the trough 360 is driven in the same manner, by the pulley 369 and up and over the idler pulley 375 to extend on out to the end pulley 383 from which the belt is carried by into the trough 360 to return to the pulley 369, all in the same manner as described in reference to the driving of the belt 380. In other words both the belts 379 and 380 are driven in unison and at the same speed. The desired tension is maintained on these belts by adjustably forcing the pulleys 381 and 383 outwardly in reference to the drive pulleys. This is done in a yielding manner by mounting the end pulleys in a manner indicated in Fig. 14, where it is shown that the pulley 381 is carried on an axle 384 mounted between vertically extending arms 385 and 386, these arms in turn being carried by a common pivot axle 387 which is fixed in a bearing below. Then there is a push rod 388 pivotly attached to the upper end of the arm 386 and normally pushed by a compression spring 389 which is adjustably tensioned by the nuts 390 forcing the spring 389 back against the face of a supporting post 391, through which the rod 388 by a reduced diameter portion slides. The other pulley 383 is rockably carried out in the same yielding manner.

Referring to Fig. 15, the troughs are continued on to the member 34 from the zones down through which the belts 379 and 380 drop to their respective drive pulleys. This continuation is made by a solid block, such as a wood block 393.

Should by accident, a mold strip get into either one or both of the troughs 360 or 361, and have their concave faces turned outwardly instead of inwardly one toward the other, safety means are provided in the nature of stop pins 394 and 395 respectively secured in position to extend from the inner walls toward the outer walls and be within the concave portions of the mold strips as they are pushed thereby. Thus it is obvious that if the strip is reversed to have the concave side turned outwardly, the back and flat side of the strip 55 would contact these pins 394 and 395 in either case and thus be stopped. That is one feature supplied by the constantly driven steel belts 379 and 380 in that should there be a stoppage of this nature of the travel of the mold strips 55 induced by the belts thereunder, the belt may continue to move in either instance and slide under these stopped mold strips 55. The same thing applies when the mold strips 55, Fig. 21, are stopped when the feed plungers 228 and 230 are pressing the mold strips 55 together as indicated. Of course in the case of stoppage of travel of the mold strips 55 under the influence of the belts 379 and 380, the operator will lift out the mold strip 55 which is incorrectly positioned within the trough so that the feed may continue.

Located at any suitable position, there is provided a pump 397 which is interconnected by an intake pipe 398 with the oil supply tank 241 and a pipe 399 which supplies oil under pressure to the master control valve 161. This valve 161 is mounted at any convenient location, herein shown as on the sill 32, Fig. 1. The valve 161 is operated by a lever 400 which is rockably supported by its lower end on a pin 401, Fig. 26, to be rockable along a sector 402. The lever 400 carries the usual latch 403 which may drop within the notches 404 for suitable selective positioning of the lever 400. The latch 403 may be lifted in the usual manner by means of the finger lever 405.

From the valve 161 extends a slide operating rod 406 which is interconnected with the lever 400 by means of a bolt 407 passing through a slot 408 in the lever 400. This rod 406 extends through a packing gland 409 carried in the housing of the valve 161 and interconnects inside of the valve with a slide member 410. This slide 410 is mounted to slide over the seat 411 through which there are provided five ports 412, 413, 414, 415, and 416.

Normally oil under pressure flowing into the valve chamber 417 from the pipe 399 will fill that chamber 417 and maintain pressure therein tending to seat the slide 410 on its seat 411. In order to prevent excessive surges of pressure within the system, there is provided a regulating relief valve generally designated by the numeral 418.

This relief 418 is interconnected by the pipe 419 with the chamber 417 and by the outlet pipe 420 to the oil supply tank 241. The valve 418 is provided with an inlet valve port 421 across which is normally positioned a valve 422 in closed condition. From the valve 422 there extends upwardly a stem 423 which is slidingly guided through a guide 424. A cylinder 425 extends upwardly from the base of the valve 426 to carry therewithin a compression spring 427, the lower end of which bears upon a plate 428 that rests upon the top end of the valve stem 423.

Then there is a top plate 429 which rests against the top end of the spring 427 to receive from the top side a screw-threaded stem 430 which screw-threadedly enters through the valve head 431 and has an adjusting hand lever 432 fixed thereon externally of the head. Suitable means such as set screws 433 are employed to retain the stem 430 in any longitudinally adjusted position as may be desired. The pipe 420 interconnects through a side outlet nipple 434 which is fixed to the cylinder 418 toward the top portion thereof. To permit free, unrestricted flow of oil upwardly through the cylinder from the inlet port 421 when the valve 422 may be lifted, the plates 428 and 429 are preferably perforated as by the holes 435 and 436 respectively. This valve is primarily provided to level off oil pressures in the entire system because, for example, when one of the pistons in any one of the cylinders above described is brought to a stop, there may be a back surge of increasing pressure, or on the other hand when the piston is started into motion, there may be a lowering of pressure which permits the relief valve to cut off immediately so that the pump 397 maintains a required pressure.

Also the pump 397 may continue to operate when the slide 410 cuts off or covers over all of the ports enumerated above so that excess pressure will not be built up by reason of the fact that the flow can be back to the supply tank through this relief valve 418. There are no packings or close fitting of slide members to interfere with the movement of the various parts in the relief valve 418, and a relatively short lift of the valve 422 permits substantially unrestricted flow of the oil from the valve chamber 417 through the valve and out into the discharge pipe 420. Moreover the particular design of this valve does away with the usual disposition of the customary safety valve and blow down pressure before closing, wherein the valve would then have to be set to operate normally from ten to twenty-five per cent higher than the desired working pressure in order to prevent that low pressure otherwise required to seat the valve 422 in the customary type of relief valves.

Referring to the diagram in Fig. 29, and to the views in Figs. 26–28 inclusive, the positions shown therein of the slide 410 are for full, unrestricted operation of the entire machine. In order to shut down the machine, the lever 400 is pulled to the extreme right, Fig. 26. In that position, the slide 410 then covers over all of the ports 412–416 inclusive.

Now assuming that it is desired to set the machine into operation, the lever 400 is rocked to the left, Fig. 26, so that the slide 410 barely uncovers a portion of the port 412. This port 412 connects with the pipe 204 which leads down to the valve 198 so that the oil may flow through the port therein numbered 200 and out the port 203 through the pipe 500 to the cylinder 59 so as to push the piston 60 into the position indicated in the diagram, Fig. 29, and also the position indicated in Fig. 6. When the machine had previously shut down, the piston 187 will have returned to the outer end of its cylinder 186 as indicated in the diagram, Fig. 29.

As the pressure builds up through the pipe 204 to operate the piston 60 as just indicated, the pair of mold strips 55 will then be presented in the uppermost positions under the members 52 and 53, Fig. 6, ready to receive the cork material. The cork feed metering device will have operated simultaneously with the travel of the piston 60 so that the cork material will have come down the conveyor chute 95 through the window 96 to be under the ram 49, and spilled down through the opening between the plates 50 and 51 to within the space between those spread apart mold strips 55. The lever 400 will then be pushed to the left further, to next in turn fully uncover the port 412 and partially uncover the port 413. With the uncovering of the port 413, the oil under pressure will flow out into the pipe 211 which is interconnected with that port. Oil will flow into the valve 209 from the port 210 and out through the port 222, and thence through the pipe 223 to the top of the cylinder 44. Oil under pressure enters the cylinder 44 through its head 45 by coming through the passageway 440, from which the oil may flow through small passageways 441 so that the pressure within the cylinder 44 is very slowly built up by that flow. There is a port 442 provided from this passageway 440, Fig. 5, which communicates with a chamber 443, and from which chamber 443 oil may flow back down through a vertical passageway 445 as may be controlled by the valve 446 adjusted from outside by means of the hand wheel 447. By means of this adjustably positioned valve 446, the speed of operation of the entire machine is controlled. In other words the piston 46 can only be forced downwardly as rapidly as the pressure may be built up in the upper end of the cylinder 44. By lifting the valve 446, this pressure may be more quickly reached as to the operating condition than when the valve 446 may be lowered. A quick pressure reduction means is employed by placing a second valve 448 over a port 449 which is at the upper end of a vertical passageway 450 in the head 45. A spring 451 normally seats the valve 448 to a closed position. Excess pressure within the upper end of the cylinder 44 may be relieved by escape of the oil through the passageway 450 to lift the valve 448 and allow the oil to flow into the chamber 443 and back into the pipe 223.

The uncovering of the port 413 thus puts the top pack plunger 49 into operation to compress the cork downwardly between the two mold strips 55. Then upon further rocking of the lever 400 to the left, the next port 414 is partially uncovered, the first two ports 412 and 413 remaining uncovered so as to keep the oil pressure supplied thereto. The port 414 connects with the pipe line 160 which leads to the valve 154 to flow out the port 159 therein and across and out the port 154 into the top end of the cylinder 164 so that pressure is built up therein tending to force the piston 165 downwardly. This downward travel of the piston 165 causes the member 172 to be carried inwardly under the crossbar 53 so as to force the mold strip 55 across and against the opposite mold strip to complete the side pack operation. Normally when the piston 165 is in its upper position, this member 172 is in the position as indicated in Fig. 6 so that the two mold strips are separated as indicated for the top pack. In any event the two mold strips are now pressed together and the compression of the cork material therebetween is completed.

Then the lever 400 is pushed to its extreme position to the left to finally uncover the port 415 so as to permit oil pressure in the chamber 417 to be communicated therewith. This port 415 is interconnected with the pipe 179 which leads to the valve 176 to discharge therein through the port 178 and flow through the valve and out the port 182, and down the pipe 184 to the outer end of the cylinder 186 to operate the mold strip ejecting plunger 190 to carry the pair of strips on into the tunnel 192. Then on, the machine will continue to work automatically in the same sequence of operations as just described. By reason of the design of the valve as indicated, the machine may be stopped and then each cylinder checked consecutively for its operation to check any difficulty or any individual operation.

The side pusher cylinders 214—217 work automatically upon the operation of the piston 46 in the cylinder 44, and hence there is no port provided for oil flow directly to them from the valve 161. The slide 410 in the valve 161 has a peculiar construction in that it resembles in cross-section an inverted V form. Then to provide passageways for oil flow from the chamber 417 to the various ports 412—415, there are transverse openings 452 provided in the slide 410, these openings 452 entering from both of the side, sloping faces 453 and 454 of the slide 410, Fig. 27. The width of these passageways 452, longitudinally of the slide 410 are made to vary in accordance with the valve travel operation above described in order that one port may be opened successively after the other port beginning with port 412 and continuing on to port 415. Of course the lands between these passageways 452 are made to provide for that consecutive opening of the various ports.

There is a further feature incorporated in the valve 161 that is of importance. This is the feature of automatically reducing the pressure in the various flow lines to the operating cylinders so that the various cylinders may be operated upon when necessary, such as in repacking the glands about the various pistons and the like, without the leakage of oil under pressure. In this regard, the port 416 is interconnected with a pipe 455 which returns to the oil supply tank 241. This port 416 is the opening from a transverse passageway 456 which is provided in the base of the valve 161 and which is interconnected directly with the pipe 455.

The underside of the valve slide 410 is formed to have a chamber 457 which is always open over the port 416 regardless of the position of the slide 410. From this chamber 457 there is a vertically disposed passageway 458 which leads into a longitudinal passage 459.

Small passageways 460, 461, and 462 are drilled upwardly from the underside of the slide 410 to enter the longitudinal passageway 459, Fig. 26. The openings into these passageways 460, 461, and 462, are spaced apart one from the other to be located such as when the slide 410 is in the extreme right hand position, the opening into the passageway 462 registers with the port 412; the opening into the passageway 461, registers with the port 413; the opening into the passageway 460, registers with the port 410; and the chamber 457 has its forward portion over the port 415 while the rear portion is over the port 416. Therefore all of the oil under pressure in the lines leading to these ports 412, 413, 414, and 415 may bleed back through those passageways 462, 461, and 460, and into the chamber 457 respectively until the pressure is reduced to substantially atmospheric pressure by reason of the flow of the oil back through the passageway 456 and the pipe 455 into the oil supply tank 241. Thus the pressure is relieved throughout the entire hydraulic system. Then when the valve slide 410 is shifted into the operating positions as above described, the entrance into these passageways 462, 461, and 460 as well as into the chamber 457 is shut off by reason of the entry ways being over solid portions of the surface 411.

Thus it is to be seen that there is herein described and shown a machine for forming a continuous length of a rod or cylinder of cork by the process of intermittently producing lengths of the rod by packing the rod into molds from two directions 90 degrees apart and then bonding one of those lengths to the next length previously formed and so on in a continuous manner. As above indicated, there will be sufficient extrusion of the cork material from one pair of the mold strips 55 to be compressed against the extruded portion of the cork material in the mold strips ahead to form the bond in the presence of heat within the tunnel 192 by pressure of the following mold strips. Furthermore these mold strips may be lubricated as to their top side and bottom faces by any suitable lubricant such as mica which will not contaminate to any detriment the cork materials should some of it happen to come into contact therewith. This may be desirable to facilitate the travel of the mold strips through the tunnel 192 in order to reduce friction. Also in reference above to the heating of these mold strips while the cork is therebetween, the cork material as it is fed into the machine will have a predetermined moisture content not only for the purpose of preventing the plastic from bonding to the metal mold strips, but also to serve as a heat transfer medium from the walls of the mold strips throughout the cork material therebetween.

As will have been observed, the various views have been shown without interconnecting hydraulic pipe lines with the exception of the diagrammatic representation of the entire system as shown in Fig. 29, all for the purpose of preventing confusion in checking the details of the machine proper. While the machine has been described in minor detail in the one particular form as now best known to use, it is quite obvious that many mechanical changes may be made in that structure all without departing from the spirit of the invention, and we therefore do not desire to be limited to that precise form beyond the limitations which may be imposed by the following claims.

We claim:

1. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels.

2. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed fold strips to push them into said chamber.

3. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber.

4. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber; said chamber having a mold strip discharging end opening; and means for separating the mold strips from the contained mixture.

5. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber; said chamber having a mold strip discharging end opening; and means for separating the mold strips from the contained mixture; said strip separating means including yieldingly gripping members receiving said strips upon emergence from said opening and directing said strips simultaneously from each side, laterally outwardly from said rod.

6. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber; said chamber having a mold strip discharging end opening; and means for separating the mold strips from the contained mixture; said strip separating means including yieldingly gripping members receiving said strips upon emergence from said opening and directing said strips simultaneously from each side, laterally outwardly from said rod; said gripping members consisting of rollers diagonally aligned with the axis of said rod.

7. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber; said chamber having a mold strip discharging end opening; and means for separating the mold strips from the contained mixture; said strip separating means including yieldingly gripping members receiving said strips upon emergence from said opening and directing said strips simultaneously from each side, laterally outwardly from said rod; a conveyer on each of opposite sides of said rod extending from said separating means to the zone of said compression means; said separating means discharging the mold strips onto said conveyers; and means positioning said mold strips adjacent said fixed machine member.

8. In a molding machine for forming a continuous length of rod, a chamber having a fixed length; a central fixed member extending throughout said length to have a longitudinal opening on each side thereof into said chamber; a plunger reciprocatably mounted to approach and close off said chamber from its top side; a moldable material measuring device having a discharge passageway opening to said chamber upon withdrawal of said plunger away therefrom; a pair of elevator members one on each side of said fixed member reciprocatable therealong; a plurality of mold strips each of a length to fit longitudinally across said chamber; means for placing mold strips one after another in the paths of said elevator members, each of said strips having a cavity along one side throughout its length, and the strips on said elevator members being positioned thereon to have said cavities presented one toward the other; means for actuating said elevator members to lift their respective carried strip above said fixed member to have that member form a lower closure therebetween; means for actuating said measuring device to place said material between said lifted strips; means for lowering said plunger to compress said material between said strips throughout their lengths, said plunger being limited in travel to substantially the top sides of said strips; means for forcing one of said strips toward and substantially into contact with the other to compress said material therebetween; a mold strip chamber to one end of said fixed member having a cross-sectional area substantially that of the pressed-together strips; means forcing said pressed-together strips as a unit into said mold strip chamber, said forcing means advancing in said chamber said unit to force through that chamber by said unit coming into abutment thereagainst a pair of mold strips which may have previously been forced thereinto, whereby the material in one of said strip pairs at the end thereof may contact the material at the end of that previous pair of strips to become united therewith.

9. In a molding machine for forming a continuous length of rod, a chamber having a fixed length; a central fixed member extending throughout said length to have a longitudinal opening on each side thereof into said chamber; a plunger reciprocatably mounted to approach and close off said chamber from its top side; a moldable material measuring device having a discharge passageway opening to said chamber upon withdrawal of said plunger away therefrom; a pair of elevator members one on each side of said fixed member reciprocatable therealong; a plurality of mold strips each of a length to fit longitudinally across said chamber; means for placing mold strips one after another in the paths of said elevator members, each of said strips having a cavity along one side throughout its length, and the strips on said elevator members being positioned thereon to have said cavities presented one towards the other; means for actuating said elevator members to lift their respective carried strip above said fixed member to have that member form a lower closure therebetween; means for actuating said measuring device to place said material between said lifted strips; means for lowering said plunger to compress said material between said strips throughout their lengths, said plunger being limited in travel to substantially the top sides of said strips; means for forcing one of said strips toward and substantially into contact with the other to compress said material therebetween; a mold strip chamber to one end of said fixed member having a cross-sectional area substantially that of the pressed-together strips; means forcing said pressed-together strips as a unit into said mold strip chamber, said forcing means advancing in said chamber said unit to force through that chamber by said unit coming into abutment thereagainst a pair of mold strips which may have previously been forced thereinto, whereby the material in one of said strip pairs at the end thereof may contact the material at the end of that previous pair of strips to become united therewith; heat transfer means along said mold strip chamber; and means at the discharge end of the mold strip chamber for stripping said strips from the molded material therebetween.

10. A cork rod forming machine comprising in combination a form of predetermined length; means for feeding a measured amount of a mixture of granular cork and binder to the machine into said form; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first compressing means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber; and chamber having a mold strip discharging end opening; and means for separating the mold strips from the contained mixture; said strip separating means including yieldingly gripping members receiving said strips upon emergence from said opening and directing said strips simultaneously from each side, laterally outwardly from said rod; a conveyor on each side of said stripping means receiving respectively said strips from corresponding sides of said rod; a plate on each side of said fixed member; said conveyers carrying said strips onto said plates; and side pusher members pushing said strips from said plates laterally toward said fixed member; and an elevator plunger reciprocably mounted on each side of said fixed member to carry said strips one at a time to the upper end of said fixed member.

11. A cork rod forming machine comprising in combination a form of predetermined length; means for feeding a measured amount of a mixture of granular cork and binder to the machine into said form a form of predetermined length; means for compressing said amount under uniform pressure throughout said length, said pressure being exerted from a lateral direction in respect to said length; means for compressing said amount throughout said length from a lateral direction substantially ninety degrees from said first direction; means carrying said compressed length into a heated chamber following the operation of both of said compression means, whereby said length will press against the end of a previously compressed length carried into said chamber and be bonded thereto into a continuous rod; and means reducing the temperature of the rod to substantially room temperature; said form comprising a pair of mold strips, one separated laterally from the other, each strip having an opposing channel extending longitudinally thereof; a fixed machine member extending longitudinally between said strips below said channels to serve initially as a lower form closure; said first comprising means including a plunger reciprocable toward and away from said fixed member and substantially the width of the spacing of said strips; and said second compression means comprising mechanism for forcing said strips laterally together in closed relation to encompass said mixture substantially within said channels; said carrying means including a plunger directed toward the ends of said closed mold strips to push them into said chamber; said chamber having a cross-sectional area having a contour dimensioned to receive said closed strips slidingly therethrough whereby the strips are maintained closed as they are carried through the chamber; said chamber having a mold strip discharging end opening; and means for separating the mold strips from the contained mixture; said strip separating means including yieldingly gripping members receiving said strips upon emergence from said opening and directing said strips simultaneously from each side, laterally outwardly from said rod; a conveyer on each side of said stripping means receiving respectively said strips from corresponding sides of said rod; a plate on each side of said fixed member; said conveyers carrying said strips onto said plates; and side pusher members pushing said strips from said plates laterally toward said fixed member; and an elevator plunger reciprocatably mounted on each side of said fixed member to carry said strips one at a time to the upper end of said fixed member; said plates having abutments in the paths of said strips as delivered thereon by said conveyers; each of said conveyers comprising smooth faced belts whereby feeding of said strips onto said plates is stopped upon the strips striking said abutments while the strips therebehind have the said belts slidingly travelling thereunder.

12. A cork rod forming machine automatically, hydraulically operated, comprising in combination, a molding chamber; a compressing plunger; a pressure cylinder actuating said plunger toward and away from said chamber; mold strips; positioning plungers for placing said strips in said chamber; a pressure cylinder operating said positioning plungers; a cork molding material measuring device dischargeable into said chamber; means interconnecting said device and said positioning plunger cylinder for actuating the device; a shiftable member along the side of said chamber forming a part of the side wall thereof; a pressure cylinder interconnected with said shiftable member to force it into said chamber to carry said strips one against the other; a chamber entering plunger to eject said strips from said chamber; a tunnel receiving and holding together said ejected mold strips; a pressure cylinder operating said ejecting plunger; plates for carrying a supply of mold strips; a pair of plungers carrying strips in laterally spaced apart relation into said chamber from said plates to receive said material therebetween; a pressure cylinder for actuating said last plungers; a source of supply of fluid under pressure; a master control valve through which said fluid flows; a valve operated by each of said cylinders; and fluid pipes between said master valve, said cylinder valves, and said cylinders, said pipes being interconnected therebetween to have said cylinders operate in timed sequence, a valve operated by one cylinder to control another cylinder to have that sequence of strips placed in said chamber, the measuring device operated to place material between the mold strips in the chamber, the compressing plunger compacting the material between the strips, the shiftable member pushed in to close together the mold strips, the pressed-together strips ejected from the chamber, and another pair of strips placed in the chamber.

13. A cork rod forming machine automatically, hydraulically operated, comprising in combination, a molding chamber; a compressing plunger; a pressure cylinder actuating said plunger toward and away from said chamber; mold strips; positioning plungers for placing said strips in said chamber; a pressure cylinder operating said positioning plungers; a cork molding material measuring device dischargeable into said chamber; means interconnecting said device and said positioning plunger cylinder for actuating the device; a shiftable member along the side of said chamber forming a part of the side wall thereof; a pressure cylinder interconnected with said shiftable member to force it into said chamber to carry said strips one against the other; a chamber entering plunger to eject said strips from said chamber; a tunnel receiving and holding together said ejected mold strips; a pressure cylinder operating said ejecting plunger; plates for carrying a supply of mold strips; a pair of plungers carrying strips in laterally spaced apart relation into said chamber from said plates to receive said material therebetween; a pressure cylinder for actuating said last plungers; a source of supply of fluid under pressure; a master control valve through which said fluid flows; a valve operated by each of said cylinders; and fluid pipes between said master valve, said cylinder valves; and said cylinders, said pipes being interconnected therebetween to have said cylinders operate in timed sequence, a valve operated by one cylinder to control another cylinder to have that sequence of strips placed in said chamber, the measuring device operated to place material between the mold strips in the chamber, the compressing plunger compacting the material between the strips, the shiftable member pushed in to close together the mold strips, the pressed-together strips ejected from the chamber; and another pair of strips placed in the chamber; and means controlling rate of fluid flow into said cylinder actuating said compressing plunger as means for controlling the time for effecting one complete cycle of said sequence.

14. A cork rod forming machine automatically, hydraulically operated, comprising in combination, a molding chamber; a compressing plunger; a pressure cylinder actuating said plunger toward and away from said chamber; mold strips; positioning plungers for placing said strips in said chamber; a pressure cylinder operating said positioning plungers; a cork molding material measuring device dischargeable into said chamber; means interconnecting said device and said positioning plunger cylinder for actuating the device; a shiftable member along the side of said chamber forming a part of the side wall thereof; a pressure cylinder interconnected with said shiftable member to force it into said chamber to carry said strips one against the other; a chamber entering plunger to eject said strips from said chamber; a tunnel receiving and holding together said ejected mold strips; a pressure cylinder operating said ejecting plunger; plates for carrying a supply of mold strips; a pair of plungers carrying strips in laterally spaced apart relation into said chamber from said plates to receive said material therebetween; a pressure cylinder for actuating said last plungers; a source of supply of fluid under pressure; a master control valve through which said fluid flows; a valve operated by each of said cylinders; and fluid pipes between said master valve, said cylinder valves; and said cylinders, said pipes being interconnected therebtween to have said cylinders operate in timed sequence, a valve operated by one cylinder to control another cylinder to have that sequence of strips placed in said chamber, the measuring device operated to place material between the mold strips in the chamber, the compressing plunger compacting the material between the strips, the shiftable member pushed in to close together the mold strips, the pressed-together strips ejected from the chamber; and another pair of strips placed in the chamber; and means controlling rate of fluid flow into said cylinder actuating said compressing plunger as means for controlling the time for effecting one complete cycle of said sequence; each of said valves receiving its supply of fluid under pressure directly from said master valve.

15. A cork rod forming machine automatically, hydraulically operated, comprising in combination, a molding chamber; a compressing plunger; a pressure cylinder actuating said plunger toward and away from said chamber; mold strips; positioning plungers for placing said strips in said chamber; a pressure cylinder operating said positioning plungers; a cork molding material measuring device dischargeable into said chamber; means interconnecting said device and said positioning plunger cylinder for actuating the device; a shiftable member along the side of said chamber forming a part of the side wall thereof; a pressure cylinder interconnected with said shiftable member to force it into said chamber to carry said strips one against the other; a chamber entering plunger to eject said strips from said chamber; a tunnel receiving and holding together said ejected mold strips; a pressure operating said ejecting plunger; plates for carrying a supply of mold strips; a pair of plungers carrying strips in laterally spaced apart relation into said chamber from said plates to receive said material therebetween; a pressure cylinder for actuating said last plungers; a source of supply of fluid under pressure; a master control valve through which said fluid flows; a valve operated by each of said cylinders; and fluid pipes between said master valve, said cylinder valves, and said cylinders, said pipes being interconnected therebetween to have said cylinder operate in timed sequence, a valve operated by one cylinder to control another cylinder to have that sequence of strips placed in said chamber, the measuring device operated to place material between the mold strips in the chamber, the compressing plunger compacting the material between the strips, the shiftable member pushed in to close together the mold strips, the pressed-together strips ejected from the chamber, and another pair of strips placed in the chamber; mold strip cross feed plungers urging said strips across said plates into the paths of said plungers which carry the strips into said chamber; pressure cylinders operating said cross feed plungers; and said compression plunger cylinder exhausting into said cross feed pressure cylinders to set up said urging.

16. That method of forming a continuous length of cork rod consisting of a material composed of granulated cork bonded together following pressure and heat, comprising pressing a discrete amount of said material laterally and uniformly along a predetermined length thereof; applying additional pressure thereto from a lateral direction substantially at right angles to the direction of application of the first pressure; holding the material under those pressures and applying heat thereto; pressing a second like length of said material laterally from one direction; pressing that second length laterally from another, substantially ninety degree apart direction; forcing the second length while under pressure longitudinally into abutment by one end against the end of the first compressed length and holding the two lengths together to establish a bond therebetween while under pressure and heat; and repeating those steps to join one length of laterally compressed material to a preceding length, one after the other.

17. That method of forming a continuous length of cork rod from a mixture of cork granules, a trace of moisture, and a bonding material, which comprises pressing the material between two spaced apart mold strips having opposing cavities, open at the strip ends to effect a uniform packing of the material from the side, longitudinally of and between the strips; forcing the strips laterally together to compress further said material therebetween; heating the strips while held together to vaporize said moisture; packing another batch of said material in the same manner between two more mold strips and forcing the strips together; then longitudinally forcing one pair of said strips against the other to bring exposed material at the end of one compressively against the material exposed at the end of the other pair of strips; and holding the strips until bonding between those ends is effected.

18. That method of forming a continuous length of cork rod from a mixture of cork granules, a trace of moisture, and a bonding material, which comprises pressing the material between two spaced apart mold strips having opposing cavities, open at the strip ends to effect a uniform packing of the material from the side, longitudinally of and between the strips; forcing the strips laterally together to compress further said material therebetween; heating the strips while held together to vaporize said moisture; packing another batch of said material in the same manner between two more mold strips and forcing the strips together; then longitudinally forcing one pair of said strips against the other to bring exposed material at the end of one compressively against the material exposed at the end of the other pair of strips; and holding the strips until bonding between those ends is effected; cooling said strips after said end bonding to condense said vaporized moisture on the inner walls of said strip cavities; and stripping the mold strips from the material therebetween.

ROBERT P. SMITH.
FRED E. JAMES.

REFERENCES CITED

The following references are of record in the file of this patent:

UNITED STATES PATENTS

| Number | Name | Date |
|---|---|---|
| 1,654,761 | Stevenson | Jan. 3, 1928 |
| 1,966,378 | Dinzl | July 10, 1934 |
| 2,296,516 | Goss | Sept. 22, 1942 |